（12）United States Patent
Itou

(10) Patent No.: US 7,787,874 B2
(45) Date of Patent: Aug. 31, 2010

(54) PORTABLE ELECTRONIC DEVICE, RECORDING MEDIUM AND COMMUNICATION FUNCTION CHANGEOVER METHOD

(75) Inventor: Toshihisa Itou, Yokohama (JP)

(73) Assignee: Casio Hitachi Mobile Communications Co., Ltd., Tokyo (JP)

( * ) Notice: Subject to any disclaimer, the term of this patent is extended or adjusted under 35 U.S.C. 154(b) by 722 days.

(21) Appl. No.: 11/710,663

(22) Filed: Feb. 22, 2007

(65) Prior Publication Data

US 2007/0213040 A1 Sep. 13, 2007

(30) Foreign Application Priority Data

Mar. 10, 2006 (JP) ............................... 2006-066802

(51) Int. Cl.
H04M 3/00 (2006.01)
(52) U.S. Cl. ..................................................... 455/419
(58) Field of Classification Search ................ 455/41.2, 455/419, 418, 406, 562.1, 411; 370/355, 370/328
See application file for complete search history.

(56) References Cited

U.S. PATENT DOCUMENTS

| | | | |
|---|---|---|---|
| 2005/0208975 A1* | 9/2005 | Lau ........................... | 455/562.1 |
| 2006/0035632 A1* | 2/2006 | Sorvari et al. ................ | 455/418 |
| 2006/0291455 A1* | 12/2006 | Katz et al. ................... | 370/355 |

FOREIGN PATENT DOCUMENTS

| | | |
|---|---|---|
| JP | 04-334215 | 11/1992 |
| JP | 10-191454 | 7/1998 |
| JP | 2001-119452 | 4/2001 |
| JP | 2001-320755 | 11/2001 |
| JP | 2003-032261 | 1/2003 |
| JP | 2003-060556 | 2/2003 |
| JP | 2003-069670 | 3/2003 |
| JP | 2004-235713 | 8/2004 |
| JP | 2004-349994 | 12/2004 |
| JP | 2005-057538 | 3/2005 |
| JP | 2006-319878 | 11/2006 |
| JP | 2007-116294 | 5/2007 |
| JP | 2007-228241 | 9/2007 |

OTHER PUBLICATIONS

Office Action dated Apr. 22, 2008 (with English translation) issued for the Japanese Patent Application No. 2006-066802.

* cited by examiner

Primary Examiner—Melody Mehrpour
(74) Attorney, Agent, or Firm—Cohen Pontani Lieberman & Pavane LLP

(57) ABSTRACT

A mobile terminal has a wide-area wireless communication unit having a communication function of performing wireless communication with a public network, a mobile terminal communication unit having a communication function of performing wireless data communication with a local area network, and an information acquisition unit that performs wireless short-range communication with an information supply device which supplies information. The information acquisition unit performs communication with the information supply device to acquire information indicating whether or not wireless data communication over the local area network is possible near a location where the mobile terminal is located. A controller determines whether or not the data communication is possible based on the information acquired by the information acquisition unit, enables the communication function of the mobile terminal communication unit upon determination that the data communication is possible, and disables the communication function upon determination that the data communication is not possible.

11 Claims, 16 Drawing Sheets

| FREQUENCY RANK | 1 | 2 | 3 | 4 |
|---|---|---|---|---|
| FREQUENCY OF TRACKING OPERATION | 5 | 10 | 15 | 20 |

FIG 10A

| WIRELESS COMMUNICATION UNIT | FREQUENCY RANK | COMMUNICATION FUNCTION |
|---|---|---|
| WIDE-AREA WIRELESS COMMUNICATION UNIT 160 (CELLULAR PHONE WIRELESS SYSTEM) | 1 | ENABLED |
| MOBILE TERMINAL COMMUNICATION UNIT 120 (W-LAN) | 3 | ENABLED |

FIG 10B

| WIRELESS COMMUNICATION UNIT | FREQUENCY RANK | COMMUNICATION FUNCTION |
|---|---|---|
| WIDE-AREA WIRELESS COMMUNICATION UNIT 160 (CELLULAR PHONE WIRELESS SYSTEM) | 2 | ENABLED |
| MOBILE TERMINAL COMMUNICATION UNIT 120 (W-LAN) | 1 | DISABLED |

FIG 10C

| WIRELESS COMMUNICATION UNIT | PRIORITY | COMMUNICATION FUNCTION |
|---|---|---|
| WIDE-AREA WIRELESS COMMUNICATION UNIT 160 (CELLULAR PHONE WIRELESS SYSTEM) | 1 | ENABLED |
| MOBILE TERMINAL COMMUNICATION UNIT 120 (W-LAN) | 2 | DISABLED |

FIG 15A

| WIRELESS COMMUNICATION UNIT | PRIORITY | COMMUNICATION FUNCTION |
|---|---|---|
| WIDE-AREA WIRELESS COMMUNICATION UNIT 160 (CELLULAR PHONE WIRELESS SYSTEM) | 2 | ENABLED |
| MOBILE TERMINAL COMMUNICATION UNIT 120 (W-LAN) | 1 | ENABLED |

FIG 15B

PORTABLE ELECTRONIC DEVICE, RECORDING MEDIUM AND COMMUNICATION FUNCTION CHANGEOVER METHOD

BACKGROUND OF THE INVENTION

1. Field of the Invention

The present invention relates to a portable electronic device having a wireless communication function, a recording medium and a communication function changeover method.

2. Description of the Related Art

There is proposed a communication device which can determine the location thereof, and automatically set an operation mode in accordance with the determined location.

For example, Unexamined Japanese Patent Application KOKAI Publication No. H10-191454 discloses a communication device having a function of receiving current location information transmitted from a gate device using a non-contact IC card, and enabling and disabling the communication function of the communication device itself in accordance with the detected location. If the current location is a location where communication is permitted, the communication device turns on the power of a communication module to enable the communication function thereof at a location where communication is prohibited in practice or a location where communication is unnecessary. Accordingly, power consumption becomes high.

Unexamined Japanese Patent Application KOKAI Publication No. 2001-320755 discloses a communication system which detects that a portable information terminal enters into the service area of the local network, allocates an extension number to the portable information terminal, thereby enabling communication using the local network. The portable information terminal uses a common communication device for a public network and an extension line. The communication device is always in activation when communication is carried out through the public network and through the extension line, and cannot suppress power consumption.

Unexamined Japanese Patent Application KOKAI Publication No. 2003-69670 discloses a cellular phone system which changes over the operation mode of a cellular phone in passing through an entrance gate. In the cellular phone system, each cellular phone has a non-contact IC card, and the entrance gate transmits a signal for instructing changeover of the operation mode to a manner mode. The cellular phone receives the mode changeover instruction signal transmitted by the gate in passing through the gate, and changes over the operation mode of the cellular phone from a normal mode to the so-called manner mode. This publication discloses that the device is set to the manner mode, but nowhere in the publication is disclosed a scheme of suppressing power consumption.

Unexamined Japanese Patent Application KOKAI Publication No. 2004-349994 discloses a cellular phone system which changes over the operation mode of a cellular phone terminal in accordance with an area and a time. This publication does not disclose a scheme of suppressing power consumption, either.

Unexamined Japanese Patent Application KOKAI Publication No. 2001-119452 discloses a wireless communication device which sequentially changes over communication mode in accordance with predetermined priorities to try communication, thereby automatically selecting any one of communication networks. The wireless communication device has a wireless circuit for PDC and a wireless circuit for PHS, and only one wireless circuit is used at one time. This publication, however, does not disclose a scheme of appropriately turning on and off the wireless circuits to thereby suppress power consumption.

Technologies for cellular phones have rapidly progressed, and there are proposed cellular phones which have not only a function of connecting the cellular phones with a public network, but also various functions, e.g., a communication function with a wireless LAN. As the number of functions increases, however, power consumption becomes high. In particular, in a case of cellular phones, it is desirable that the cellular phones should be compact in size and used for a long time without a frequent charging. However, it is difficult to fulfill all of those demands.

The foregoing publications do not disclose a scheme of suppressing power consumption in cellular phone terminals having functions of not only connecting the cellular phone terminals with a public network, but also connecting the cellular phone terminals with other networks.

Activating either one of a connection function to a wireless LAN and a connection function to a public network to suppress power consumption is possible. According to this scheme, however, an incoming call through the public network cannot be received at all when the wireless LAN is used. Unreception of an incoming call through the public network is not desirable.

SUMMARY OF THE INVENTION

The present invention has been made in view of the foregoing problems, and it is an object of the invention to suppress power consumption while continuously maintaining communication with a public network in a portable electronic device which has a communication function with the public network and a communication function with another network.

To achieve the object, a portable electronic device of the invention comprises:

a public line wireless communication circuit having a communication function of performing wireless communication with a public network;

a LAN wireless communication circuit having a communication function of performing wireless data communication with a local area network;

information acquisition unit that performs short-range wireless communication with information supply device which supplies information; and communication controller which enables or disables the communication function of the LAN wireless communication circuit in accordance with a communication of the information acquisition unit with the information supply device.

For example, the information supply device transmits service provision information indicating a state where a wireless communication service is provided at a location at which the information supply device is provided to the information acquisition unit, the information acquisition unit receives the service provision information transmitted from the information supply device, and transmits the service provision information to the communication controller, and the communication controller determines whether or not the wireless communication service is provided based on the service provision information received from the information acquisition unit, enables the communication function of the LAN wireless communication circuit when it is determined that the wireless communication service is provided, and disables the communication function of the LAN wireless communication circuit when it is determined that the wireless communication service is not provided.

For example, the portable electronic device further comprises:

a memory unit which stores predetermined information indicating a wireless communication service subscribed by the local portable electronic device; and a subscription determination unit which determines whether or not the portable electronic device subscribes the wireless communication service determined by the communication controller based on the predetermined information stored in the memory unit, when the communication controller determines that the wireless communication service is provided based on the service provision information received from the information acquisition unit, wherein the communication controller enables the communication function of the LAN wireless communication circuit when the subscription determination unit determines that the wireless communication service is subscribed, and disables the communication function of the LAN wireless communication circuit when the subscription determination unit determines that the wireless communication service is not subscribed.

For example, the portable electronic device further comprises a notification unit that notifies a user of the portable electronic device of a presence of a wireless communication service which becomes available if subscribed when the communication controller determines that the wireless communication service is provided but the subscription determination unit determines that the portable electronic device does not subscribe the wireless communication service determined by the communication controller.

For example, the service provision information received by the information acquisition unit from the information supply device includes setting information which becomes necessary in using a wireless communication service, and the communication controller sets the LAN wireless communication circuit in accordance with the setting information included in the received service provision information when it is determined that the wireless communication service is provided based on the service supply information received from the information acquisition unit.

For example, the communication controller has a timer which determines whether or not a predetermined time has elapsed, and the communication controller disables the communication function of the LAN wireless communication circuit when the communication function of the LAN wireless communication circuit is enabled and the LAN wireless communication circuit does not use the wireless communication service for more than or equal to the predetermined time counted by the timer.

For example, the public line wireless communication circuit communicates with a wireless base station in performing wireless communication with the public network, the LAN wireless communication circuit communicates with a wireless LAN base station in performing wireless data communication with the local area network, a communication range of the information acquisition unit with the information supply device is narrower than a communication range of the public line wireless communication circuit with the wireless base station, or a communication range of the LAN wireless communication circuit with the LAN base station, and the information acquisition unit has less power consumption than those of the public line wireless communication circuit and the LAN wireless communication circuit.

For example, the information acquisition unit notifies the communication controller of a communication with the information supply device, and the communication controller enables the communication function of the LAN wireless communication circuit when notified by the information acquisition unit of the communication with the information supply device.

For example, the public line wireless communication circuit and the LAN wireless communication circuit can change their operation modes, respectively, and the communication controller changes the operation modes of the public line wireless communication circuit and the LAN wireless communication circuit when the information acquisition unit notifies the communication controller of the communication with the information supply device.

For example, the communication controller has a timer which counts an elapsed time for determining whether or not a predetermined time has elapsed, and the communication controller changes the operation mode of the LAN wireless communication circuit when the communication function of the LAN wireless communication circuit is enabled and the LAN wireless communication circuit does not use the wireless communication service for more than or equal to the predetermined time counted by the timer.

For example, the public line wireless communication circuit and the LAN wireless communication circuit have tracking functions of tracking wireless communication systems, respectively, the communication controller has a function of changing a frequency of an operation of tracking the wireless communication systems by the tracking function, and the communication controller changes the frequencies of operations of tracking the wireless communication systems by the tracking functions of the public line wireless communication circuit and the LAN wireless communication circuit, thereby changing the respective operation modes of the public line wireless communication circuit and the LAN wireless communication circuit when the information acquisition unit notifies the communication controller of the communication with the information supply device.

For example, priorities each indicating a degree that the public line wireless communication circuit or the LAN wireless communication circuit is preferentially used in performing wireless communication are allocated to the public line wireless communication circuit and the LAN wireless communication circuit, respectively, the communication controller has a function of changing the priorities, and changes the respective priorities of the public line wireless communication circuit and the LAN wireless communication circuit, thereby changing the respective operation modes of the public line wireless communication circuit and the LAN wireless communication circuit when the information acquisition unit notifies the communication controller of the communication with the information supply device.

To achieve the object, a recording medium storing a program for allowing a computer to realize main functions of the invention is provided.

Further, to achieve the object, a communication changeover method for realizing communication changeover in the portable electronic device of the invention is provided.

According to the invention, as the communication controller enables or disables the communication function of the LAN wireless communication circuit in accordance with the communication of the information acquisition unit with the information supply device, the power consumption of the portable electronic device having the wireless communication function can be suppressed while continuously maintaining a communication with the public network.

BRIEF DESCRIPTION OF THE DRAWINGS

These objects and other objects and advantages of the present invention will become more apparent upon reading of the following detailed description and the accompanying drawings in which:

FIGS. 10A to 10C are diagrams illustrating examples of changing frequencies of tracking operations according to the modified example of the embodiment of the invention;

FIGS. 15A and 15B are diagrams illustrating examples of changing priorities of wireless communication units according to a modified example of the embodiment of the invention;

DETAILED DESCRIPTION OF THE PREFERRED EMBODIMENT

Embodiment

An embodiment of the invention will be explained with reference to FIGS. 1 to 5.

The embodiment is an example case where a mobile terminal 100 is used as a portable electronic device which determines whether or not a wireless communication service is provided based on service provision information received from an external information supply device 230, and changes over the communication function of a wireless communication module to enable/disable the communication function thereof based on a determination result.

Figure 1:
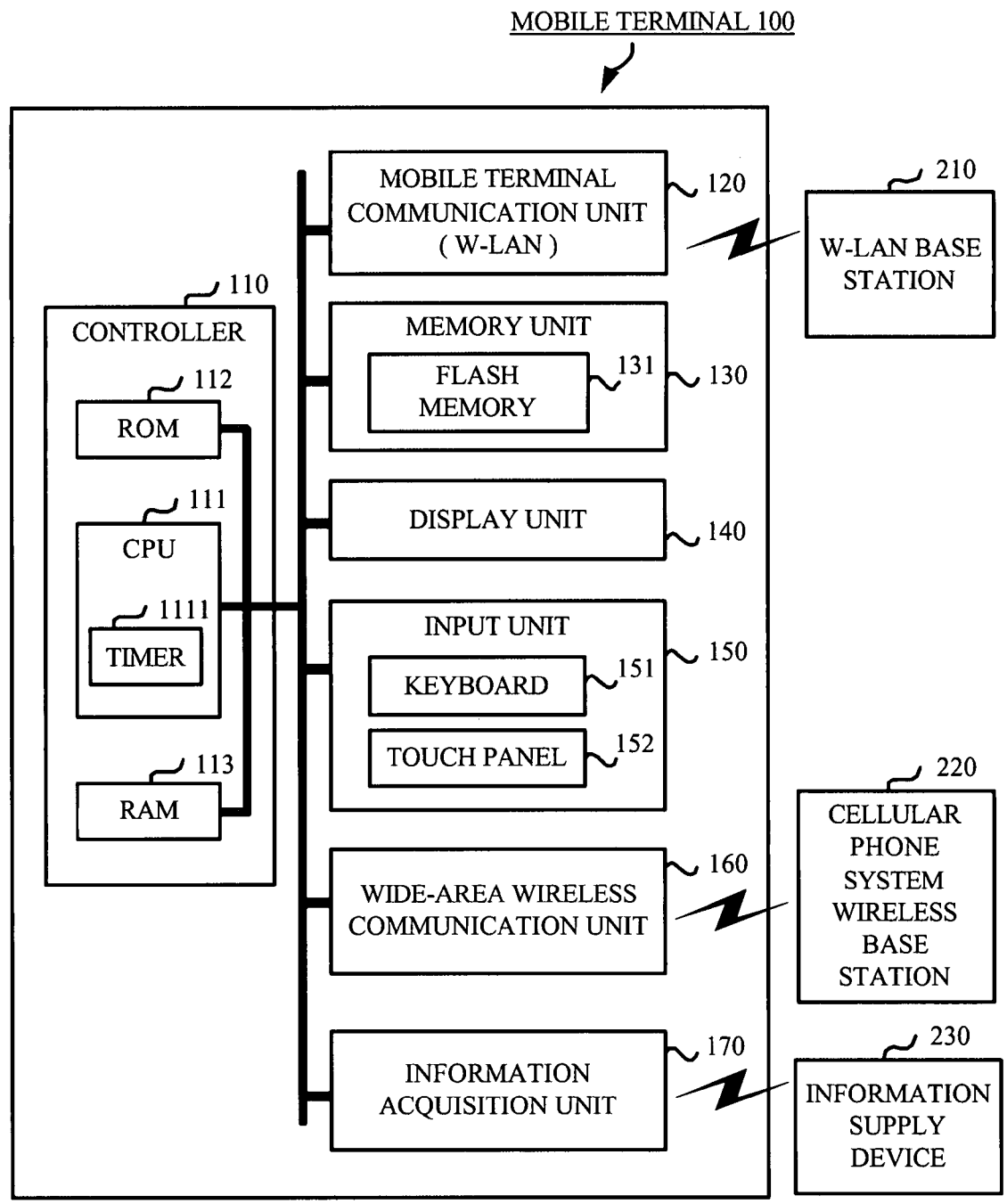
FIG. 1 is a block diagram illustrating the structure of a portable electronic device according to an embodiment of the invention.

Like the circuit structure illustrated in FIG. 1, the mobile terminal 100 according to the embodiment of the invention has a controller 110, a mobile terminal communication unit 120, a memory unit 130, a display unit 140, an input unit 150, a wide-area wireless communication unit 160, and an information acquisition unit 170.

The controller 110 has, for example, a CPU 111 which performs a computing process, a ROM (Read Only Memory) 112 which stores an operation program, and a RAM (Random Access Memory) 113 which functions as a working memory.

The controller 110 is connected to the mobile terminal communication unit 120, the memory unit 130, the display unit 140, the input unit 150, the wide-area wireless communication unit 160, and the information acquisition unit 170, and controls the individual structural units. For example, the controller 110 controls the information acquisition unit 170 to execute processes, such as authentication, and depositing/withdrawing of electronic money.

The controller 110 receives service provision information indicating presence/absence of provision of a wireless communication service near the mobile terminal 100 and a provided wireless communication service from an external information supply device 230 through the information acquisition unit 170. The controller 110 determines the contents of a W-LAN service provided near the mobile terminal 100 based on the received service provision information.

The controller 110 controls, for example, turning ON/OFF of the power of the mobile terminal communication unit 120, turning ON/OFF of the power of the wide-area wireless communication unit 160, and changing over of a priority between the mobile terminal communication unit 120 and the wide-area wireless communication unit 160 (changeover regarding which one is to be used) in accordance with a determination result.

Further, the controller 110 has a timer 1111 which counts an elapsed time from a time instant to determine whether or not a predetermined time has passed. The timer 1111 counts a predetermined time to determine, for example, whether or not the mobile terminal communication unit 120 has not been in operation for more than or equal to the predetermined time (30 seconds in the embodiment).

The mobile terminal communication unit 120 communicates with external devices, mainly, a W-LAN (Wireless Local Area Network) base station 210 in response to a request from the controller 110. The mobile terminal communication unit 120 comprises a device which performs short-range communication/narrow-area communication, such as Bluetooth®, and W-LAN (Wireless Local Area Network). In the embodiment, it is supposed that the mobile terminal communication unit 120 has a W-LAN function.

The memory unit 130 comprises, for example, a flash memory 131, a hard disk, and an optical disk. The memory unit 130 transfers required data in response to a request from the controller 110.

The memory unit 130 stores, for example, service subscribe information indicating a wireless communication service which is usable as a user of the mobile terminal 100 subscribes the wireless communication service, and service provision information acquired as the information acquisition unit 170 communicates with the external information-supply device 230.

The flash memory 131 in the memory unit 130 stores service identification information indicating the W-LAN service subscribed by the mobile terminal 100.

The display unit 140 comprises a dot-matrix type LCD (Liquid Crystal Display) panel, a driver circuit, and the like, and displays an arbitrary image. For example, the display unit 140 displays service subscribe information searched by the controller 110 and data acquired through communication in response to a request from the controller 110.

The input unit 150 has a key board 151, a touch panel 152, various keys and buttons, and speech input device for the user to input an instruction and data. The user manipulates the input unit 150, thereby inputting various instructions and pieces of data to the controller 110.

The wide-area wireless communication unit 160 performs communication through a wide-area wireless communication network in response to a request from the controller 110. In the embodiment, the wide-area wireless communication network used by the wide-area wireless communication unit 160 is a cellular phone wireless system. In this case, the wide-area wireless communication unit 160 performs communication with, for example, a cellular phone system wireless base station 220.

The information acquisition unit 170 comprises, for example, a non-contact type IC card. The contour of the information acquisition unit 170 is arbitrary, and may be in a card-like shape or a bar-like shape.

The information acquisition unit 170 communicates with the information supply device 230 when coming close to the external information supply device 230.

The format and the contents of the communication are arbitrary, but the communication includes service provision information on a wireless communication service provided near the mobile terminal 100, in addition to information on the processes of the information acquisition unit 170 (for example, authentication, consumption of a held electronic money).

The service provision information includes, for example, information on presence/absence of a W-LAN provided near the mobile terminal 100, identification information on the W-LAN, and information on various setting for using the W-LAN.

The information acquisition unit 170 transfers the service provision information acquired from the information supply device 230 to the controller 110, transmits/receives data in accordance with a request from the controller 110.

A communication range of the information acquisition unit 170 with the information supply device 230 is extremely narrower than a communication range of the mobile terminal communication unit 120 with the W-LAN base station 210, and a communication range of the wide-area wireless communication unit 160 with the cellular phone system wireless base station 220.

Accordingly, the information acquisition unit 170 has less power consumption than those of the mobile terminal communication unit 120 and the wide-area wireless communication unit 160.

Although the mobile terminal 100 has the display unit 140 according to the circuit structure in FIG. 1, a display device and a speech output device may be provided separately from the mobile terminal 100. In this case, the mobile terminal 100 is provided with an output device which outputs the service subscribe information, data acquired through communication, and the like to the display device and the speech output device.

According to the circuit structure in FIG. 1, the mobile terminal 100 has two communication modules of the mobile terminal communication unit 120 and the wide-area wireless communication unit 160. It is supposed that the mobile terminal communication unit 120 can perform high-speed communication, but the communication area is narrow. It is also supposed that the wide-area wireless communication unit 160 has a wider communication area than that of the mobile terminal communication unit 120, but can only perform slow communication.

In a case where the mobile terminal communication unit 120 is present in an area where no wireless communication service complying with the mobile terminal communication unit 120 is not provided for more than or equal to a predetermined time, the mobile terminal communication unit 120 notifies the controller 100 of the absence of the wireless communication service. In response to the notification, the controller 110 turns off the power of the mobile terminal communication unit 120, and disables the communication function. A predetermined time until the power of the mobile terminal communication unit 120 is turned off is set to 30 seconds, but is arbitrary. The predetermined time may be changed by the user through manipulation of the input unit 150, and by a control of the controller 110.

Data transmitted/received between the information acquisition unit 170 and the external information supply device 230 is not limited to the service provision information on the wireless communication service, and another kind of data may be transmitted/received. Information of, for example, the owner of the mobile terminal 100 may be transmitted/received together with the service provision information on the wireless communication service.

The operation of the mobile terminal 100 employing the structure in FIG. 1 will be explained with reference to the flowchart in FIG. 2.

Figure 2:
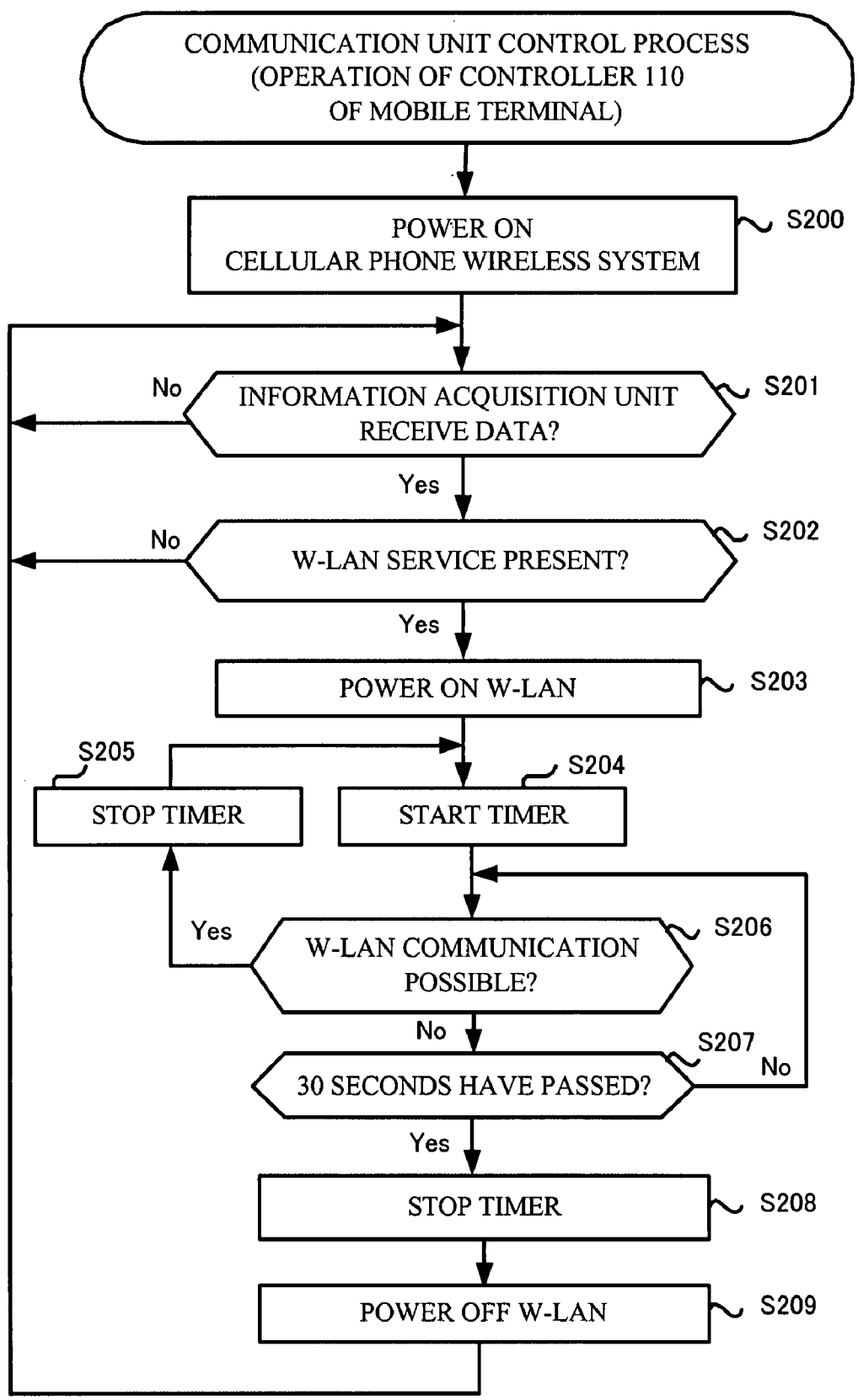
FIG. 2 is a flowchart illustrating the operation of the portable electronic device according to the embodiment of the invention.

After the mobile terminal 100 is powered on, the controller 100 completes a process like an initial setting, and then executes a communication module control process illustrated in the flowchart in FIG. 2 repeatedly together with another process.

First, the controller 110 turns on the power of the wide-area wireless communication unit 160 (a module corresponding to the cellular phone wireless system), and supplies power to the memory unit 130, the display unit 140, the input unit 150, the wide-area wireless communication unit 160, and the information acquisition unit 170 (step S200). Thereafter, the controller 110 stands by until the information acquisition unit 170 receives data from the adjacent information supply device 230 (step S201).

When having received the data from the information supply device 230, the information acquisition unit 170 outputs the received data to the controller 110. The data transmitted by the information supply device 230 includes service provision information indicating presence/absence of a wireless communication service and the provided wireless communication service.

The controller 110 determines whether or not the information acquisition unit 170 receives data from the information supply device 230 (step S201). When the data is received (step S201: Yes), the controller 110 determines whether or not a W-LAN service is present based on the service provision information in the received data (step S202).

When the W-LAN service is present (step S202: Yes), the controller 110 turns on the power of the mobile terminal communication unit 120 (i.e., the W-LAN communication unit) to enable the function thereof (step S203), and causes the display unit 140 to display a message to the effect that the function of the mobile terminal communication unit 120 is enabled.

The mobile terminal communication unit 120 whose communication function is enabled by the controller 110 can receive information from the W-LAN base station 210, and transmit inquiry information or the like to the W-LAN base station 210 during a period that the mobile terminal communication unit 120 is enabled.

Subsequently, the controller 110 starts the timer 1111 for counting a predetermined time (in the embodiment, 30 seconds) that the mobile terminal communication unit 120 is not in operation (step S204). Thereafter, the controller 110 determines whether or not the mobile terminal communication unit 120 tracks the W-LAN base station 210 so that W-LAN communication is possible (step S206). When the mobile terminal communication unit 120 tracks the W-LAN base station 210 so that the W-LAN communication is possible (step S206: Yes), the timer 1111 is caused to stop (step S205). Thereafter, the timer 1111 is restarted (step S204).

When the mobile terminal communication unit 120 does not track the W-LAN base station 210 so that the W-LAN communication is impossible (step S206: No), the controller 110 determines whether or not the predetermined time is elapsed since the timer 1111 has been started (step S207). When the predetermined time has not elapsed (step S207: No), the controller 110 determines whether or not the mobile terminal communication unit 120 tracks the W-LAN base station 210 so that W-LAN communication is possible, again (step S206).

When the predetermined time has elapsed (step S207: Yes), the controller 110 stops the timer 1111 (step S208), turns off the power of the mobile terminal communication unit 120 to disable the function thereof (step S209), and causes the display unit 140 to display a message to the effect that the function of the mobile terminal communication unit 120 is disabled. The controller 110 shifts the process to the step S201.

When having determined that there is the W-LAN service near the mobile terminal 100 based on the information received from the information supply device 230, the mobile terminal 100 turns on the power of the mobile terminal communication unit 120 to enable the function thereof.

On the other hand, when there is no W-LAN service, or when the W-LAN service is not used, the mobile terminal 100 turns off the power of the mobile terminal communication unit 120 to disable the function thereof.

Accordingly, the mobile terminal communication unit 120 is powered on so that the function thereof is enabled only when a wireless communication service is available. That is, unnecessary power consumption is suppressed when maintaining the operation of the communication function is unnecessary.

Note that turning ON/OFF of the power of the mobile terminal communication unit 120 in the steps S203, S209 in FIG. 2 may be done by the controller 110 which has received an instruction from the user through the input unit 150.

Figure 3A:
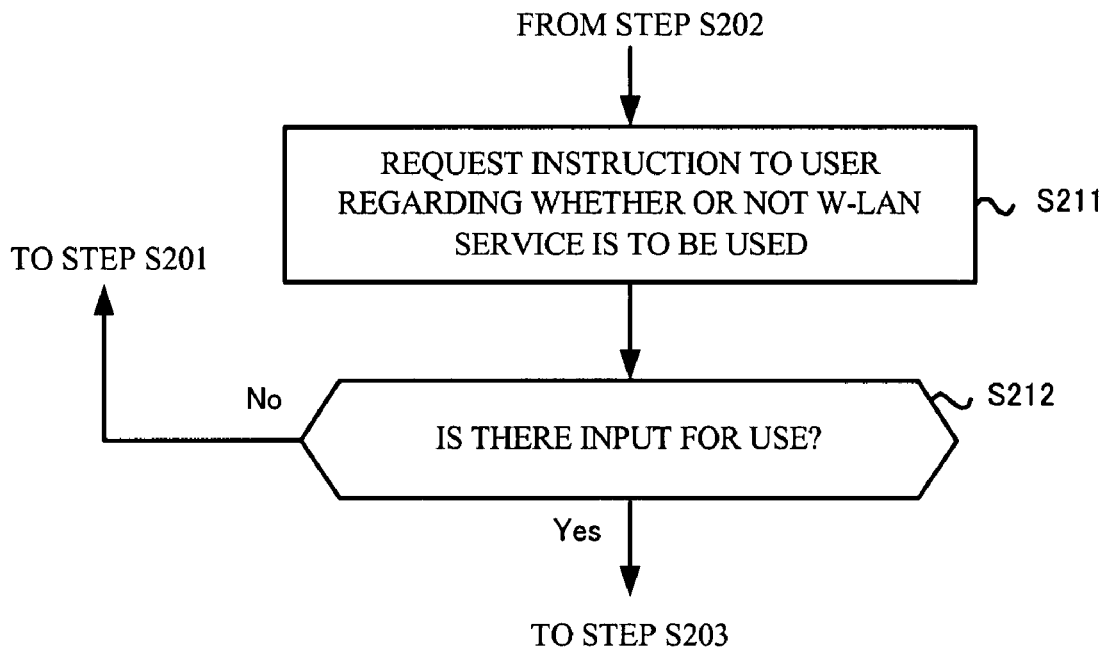
FIGS. 3A and 3B are flowcharts illustrating modified examples of the flowchart illustrated in FIG. 2.

In this case, as illustrated in FIG. 3A, when it is determined that the W-LAN service is present through the determination process in the step S202, the controller 110 may inquire the user whether or not the W-LAN service is to be used.

For example, the display unit 140 displays a message to the effect that "use W-LAN service?" or the like to request the user to give an instruction of whether or not using the LAN service (step S211). When the user manipulates the input unit 150 and gives an instruction of using the W-LAN service (step S212: Yes), the controller 110 turns on the power of the mobile terminal communication unit 120 (step S203). When the user instruct as not to use the W-LAN service (step S212: No), the controller 110 returns the process to the step S201, and maintains the power of the mobile terminal communication unit 120 OFF.

Figure 3B:
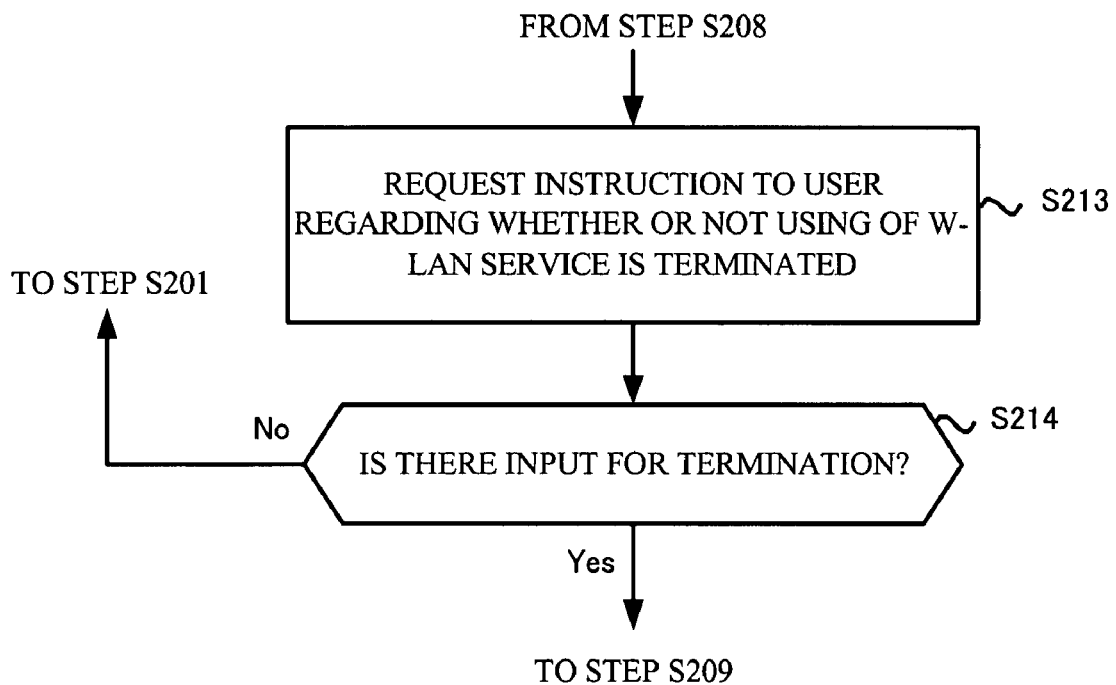

As illustrated in FIG. 3B, after the timer 1111 is stopped in the step S208, the controller may inquire the user whether or not the use of the W-LAN service is terminated.

For example, the display unit 140 displays a message to the effect that "use of W-LAN service is terminated. OK?" or the like to request the user to give an instruction of whether or not terminating the use of the W-LAN service (step S213). When the user manipulates the input unit 150 and instructs termination of the use of the W-LAN service (step S214: Yes), the controller 110 turns off the power of the mobile terminal communication unit 120 (step S209). When the user gives an instruction of maintaining the use of the W-LAN service (step S214: No), the controller 110 maintains the power of the mobile terminal communication unit 1200N.

Figure 4:
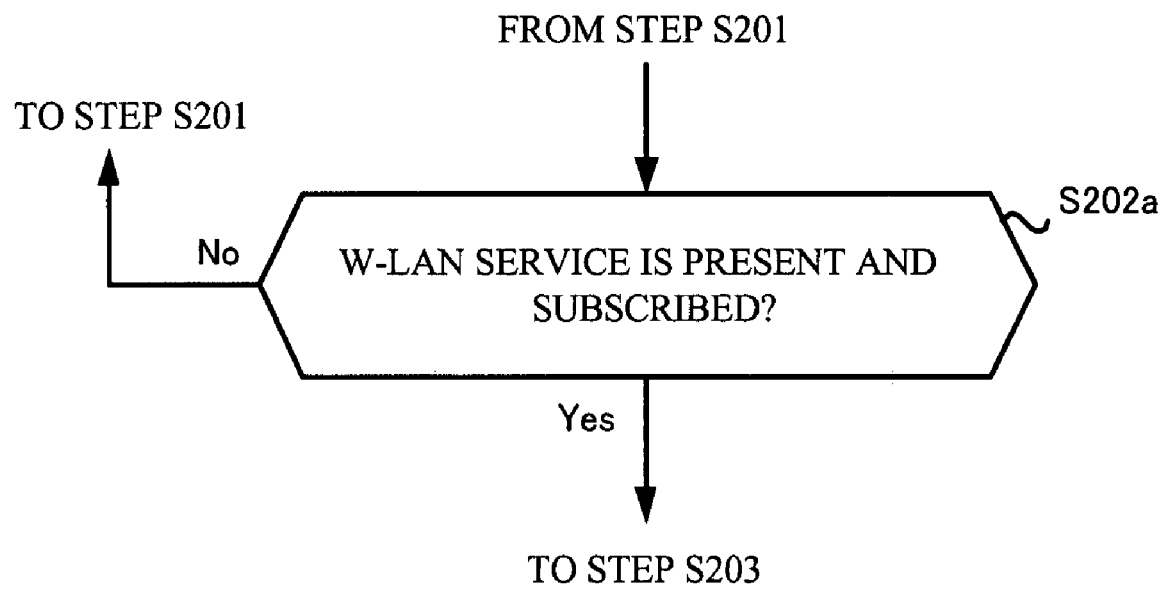
FIG. 4 is a flowchart illustrating a modified example of the flowchart illustrated in FIG. 2.

In a case where subscription registration to use the W-LAN service is required, the controller 110 determines, for example, whether or not there is the W-LAN service and the local mobile terminal 100 subscribes the W-LAN service (or subscription is prerequisite) in step S202a as illustrated in FIG. 4.

Only when a determination results represents that there is the W-LAN service and the local mobile terminal 100 subscribes the service (or subscription is not prerequisite), the controller 110 may turn on the power of the mobile terminal communication unit 120 to use the W-LAN service (step S203).

Whether or not the mobile terminal 100 subscribes the W-LAN service can be determined based on, for example, service provision information from the information supply device 230. It may be possible to determine whether or not the identification information of the W-LAN service indicated by the service provision information and provided near the mobile terminal 100 matches with service identification information stored in the flash memory 131.

When having determined that subscription registration is required to use the W-LAN service and the local mobile terminal 100 is not yet registered, the controller 110 may inquire the user of whether or not to register.

At this time, after the user registers with the W-LAN service, the controller 110 may turns on the power of the mobile terminal communication unit 120.

Figure 5:
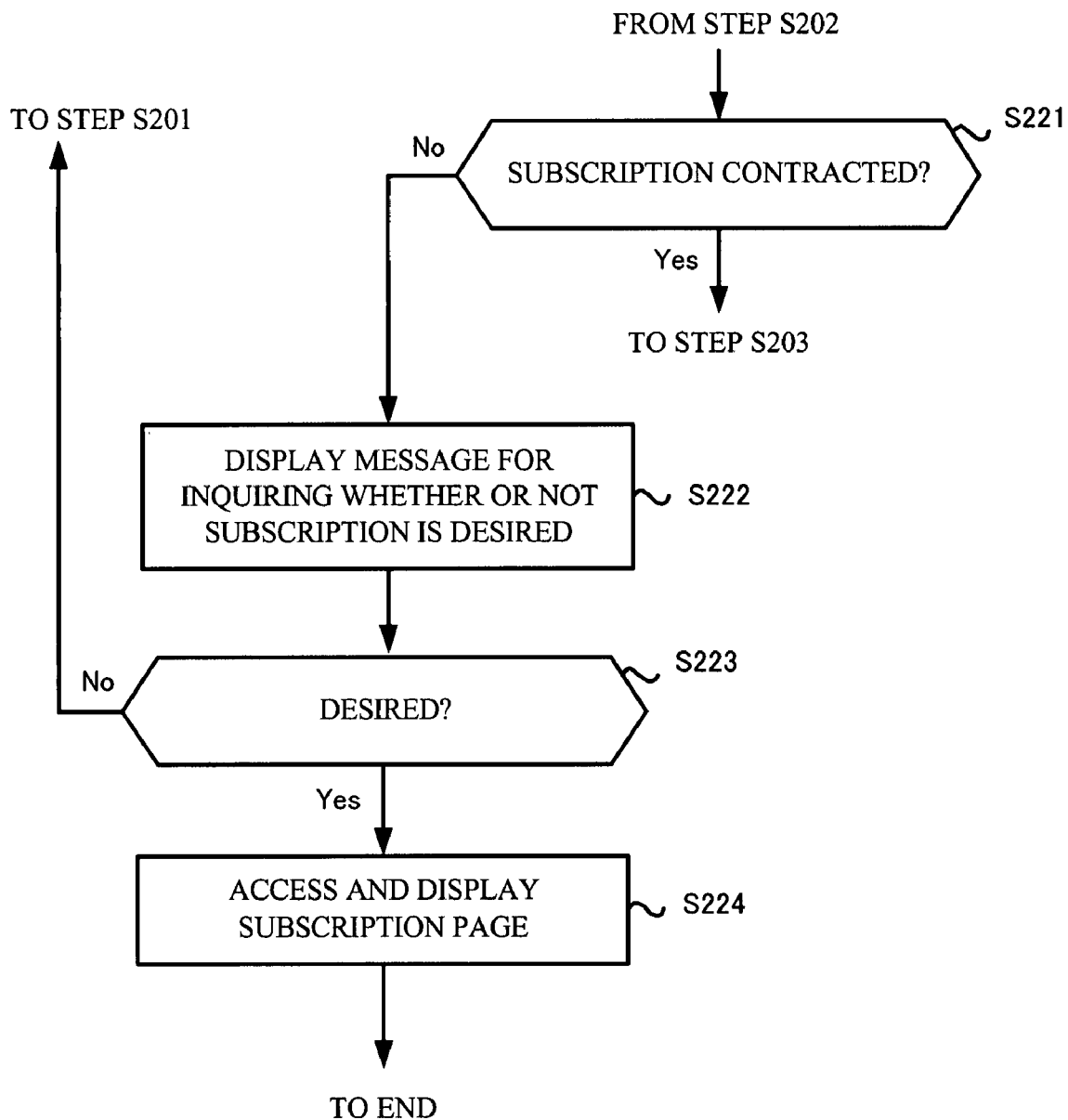
FIG. 5 is a flowchart illustrating a modified example of the flowchart illustrated in FIG. 2.

In this case, for example, as illustrated in FIG. 5, when a determination result in the step S202 represents that there is the W-LAN service (step S202: Yes), the controller 110 further determines whether or not the user of the local mobile terminal 100 has a contract of using the W-LAN service (whether or not the mobile terminal 100 has an authority for use) (step S221).

When a determination result represents that the user has the contract (authority for use: e.g., the user already has a membership, the service is freely opened for everyone) (step S221: Yes), the process progresses to the step S203, and the controller 110 turns on the mobile terminal communication unit 120.

When the determination result represents that the user of the local mobile terminal 100 does not have a contract for using the notified W-LAN service (has no authority for use) (step S221: No), the controller 110 causes the display unit 140 to display an announcement message (invitation message, recommendation message) to the effect that "W-LAN service is provided. Register?", and requests the user to give an instruction regarding whether or not to subscribe the W-LAN service (step S222).

When the user manipulates the input unit 150, and instructs subscription (step S223: Yes), the controller 110 may access a Web page for registration in accordance with a notification from the information supply device 230, and cause the display unit 140 to display the Web page (step S224). When the registration is completed as the user performs necessary input operation or the like over the registration Web page, the controller 110 turns on the power of the mobile terminal communication unit 120. When the registration is not carried out, the controller 110 maintains the OFF state of the mobile terminal communication unit 120.

APPLIED EXAMPLE

A specific applied example of the mobile terminal 100 illustrated in FIGS. 1 and 2 will be explained with reference to FIGS. 6 to 17.

Figure 6:
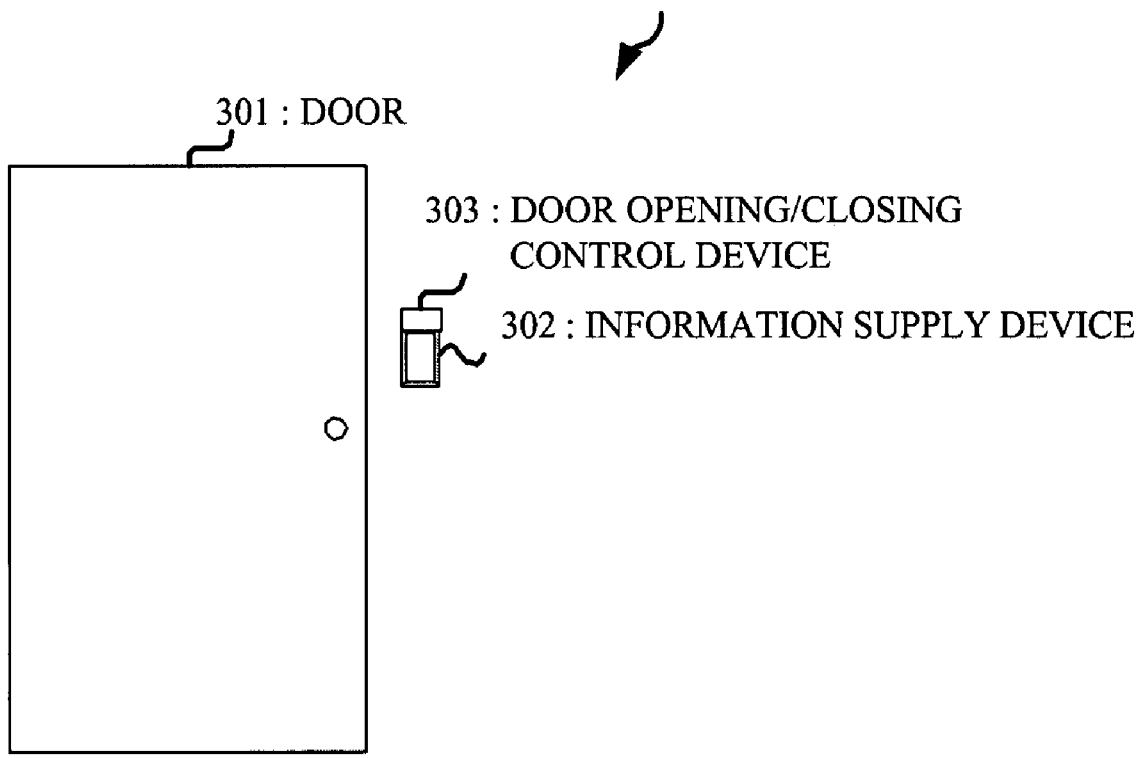
FIG. 6 is a diagram illustrating an example case where the portable electronic device of the invention is used.

FIG. 6 illustrates an example case where information on the owner of the mobile terminal 100 is used for entrance management into a predetermined area (e.g., a room, a space in the gate of a station).

In the example case, as an entrance management device 300, a door (gate) 301 which can electrically controls locking/unlocking of a key and automatically lock the key when closed is provided at an entrance into the predetermined area, an information supply device 302 is provided next to the door 301, and a door opening/closing control device 303 is provided.

In the example, the predetermined area is an arbitrary facility, an arbitrary building, a room, the platform of a station, or the like.

The door 301 is provided at the entrance of the area, electrically controls locking/unlocking of the key, and automatically locks the key when closed. The information supply device 302 is provided next to the door 301.

The door opening/closing control device 303 performs communication between the information acquisition unit 170 of the mobile terminal 100 of a person who comes close to the door 301 and the information supply device 302, and acquires information on the owner of the mobile terminal 100 owned by the person who comes close to the door 301.

When the owner information indicates a person who has a permission to enter the area, the door 301 unlocks the key. In this case, the information acquisition unit 170 stores, for example, authentication information, an authentication program, and charging information corresponding to an entrance fee.

When the person who comes close to the door 301 has the permission to enter the area (e.g., the entrance fee can be withdrawn), the door opening/closing control device 303 causes the information supply device 302 to transmit wireless communication service information indicating a wireless communication service provided in the area to the information acquisition unit 170.

The controller 110 of the mobile terminal 100 of the person who comes close to the door 301 analyzes the received wireless communication service information, and determines whether or not the wireless communication service is available for the mobile terminal communication unit 120 of the mobile terminal 100. When the provided wireless communication service is available, the controller 110 turns on the power of the mobile terminal communication unit 120 to enable the function thereof, thereby enabling communication.

In the example in FIG. 6, the door 301 which is provided at the entrance into the predetermined area and controls entrance is not limited to a general door, and may be one which is formed in a bar-like shape or a plate-like shape and can shut off passage, like an automatic ticket gate of a station or an entrance gate of a building.

In a case where the predetermined area is present inside the gate of the station, the door 301 comprises, for example, an automatic ticket gate of a station, and the information acquisition unit 170 comprises, for example, a prepaid ticket or commuter pass, or, a pay-later type ticket or commuter pass constituted by an IC card.

The door opening/closing control device 303 communicates with the information acquisition unit 170 through the information supply device 302, and determines whether or not the user has an authority to enter the area inside the gate (whether or not the user has a commuter pass, or whether or not a freight charge can be withdrawn). When the user has the authority to enter, the gate 301 of the automatic ticket gate is opened, and when the user passes through the gate 301, the gate 301 is closed.

When the person has the permission to enter the area inside the gate, the door opening/closing control device 303 causes the information supply device 302 to transmit wireless communication service information indicating the wireless communication service provided at the platform to the information acquisition unit 170.

The controller 110 of the mobile terminal 100 owned by the person who comes close to the gate 301 analyzes the received wireless communication service information, and determines whether or not the communication service is available for the mobile terminal communication unit 120 of the mobile terminal 100. When the communication service is available, the controller 110 turns on the power of the mobile terminal communication unit 120 to enable the function thereof, thereby enabling communication. An operation when the user gets out from the area inside the gate of the station to the outside is almost the same as the foregoing operation.

Figure 7:
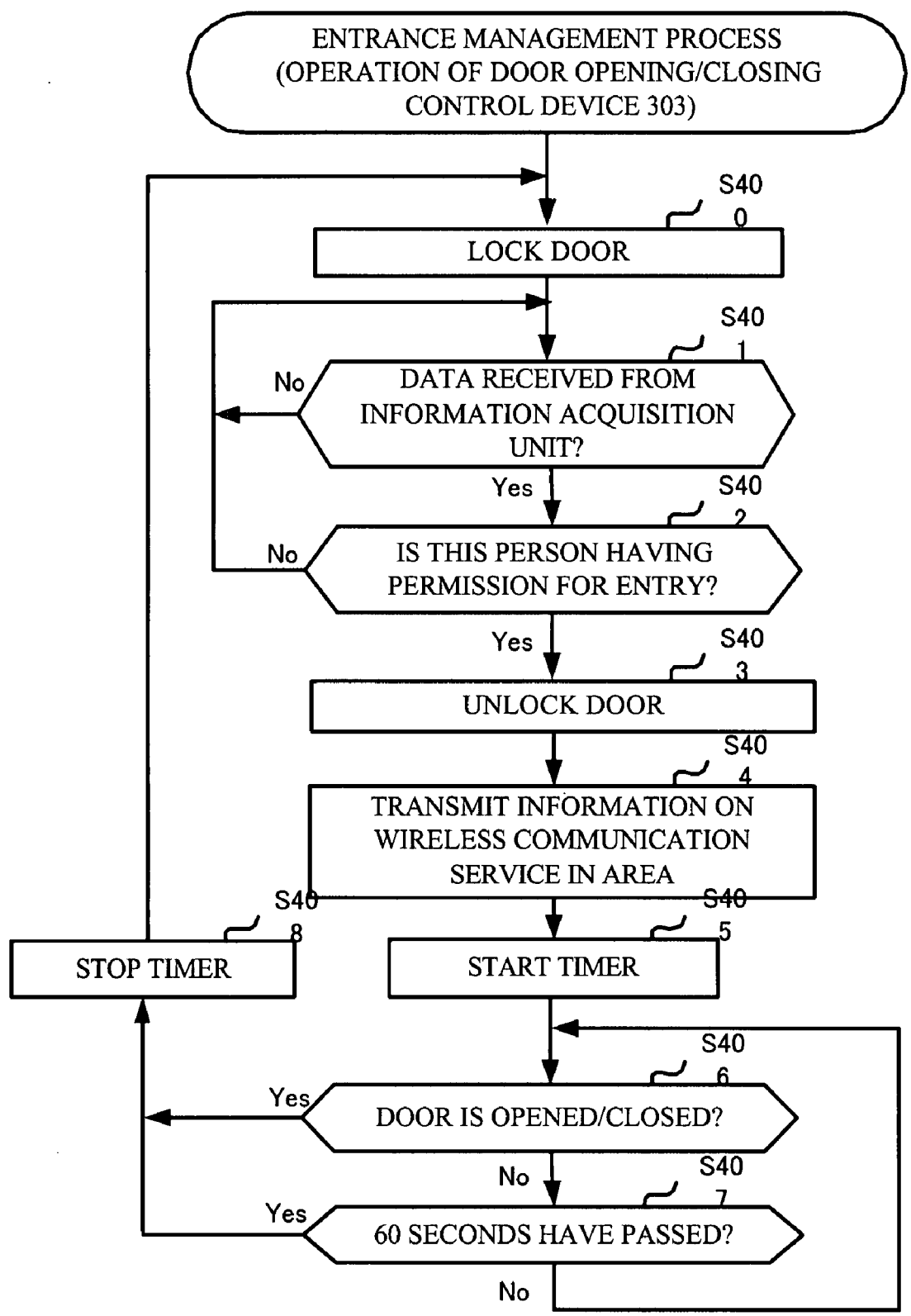
FIG. 7 is a flowchart illustrating the operation of an entrance management device which uses the portable electronic device of the embodiment of the invention.

An explanation will be given of an operation of the door opening/closing control device 303 illustrated in FIG. 6 with reference to FIGS. 7 and 2. After the power is on, the door opening/closing control device 303 executes a process illustrated in the flowchart in FIG. 7.

First, the door opening/closing control device 303 instructs the door 301 to lock the key, and the door 301 locks the key (step S400). Thereafter, the door opening/closing control device 303 stands by until receiving data from the information acquisition unit 170 embedded in the mobile terminal 100 (step S401). When the mobile terminal 100 comes close to the information supply device 302, the information supply device 302 communicates with the information acquisition unit 170, acquires information on the owner of the mobile terminal 100, and transfers the information to the door opening/closing control device 303.

When receiving the owner information transferred from the information acquisition unit 170 (step S401: Yes), the door opening/closing control device 303 determines whether or not the user of the mobile terminal 100 is a person who has a permission to enter based on the owner information (step S402).

When the user is the person who has the permission (step S402: Yes), the door 301 is unlocked and opened (step S403). Further, the door opening/closing control device 303 causes the information supply device 302 to transmit information on the wireless communication service provided in the area to the information acquisition unit 170 (step S404). The information acquisition unit 170 transmits the notified information to the controller 110.

The door opening/closing control device 303 starts a timer (step S405), and determines whether or not the door 301 is opened/closed (step S406). When the door is opened/closed, the door opening/closing control device 303 stops the timer (step S408), and locks the door 301 again (step S400).

When the door is not opened/closed (step S406: No), the door opening/closing control device 303 checks the timer to check whether or not a predetermined time has passed (step S407). In the example, the predetermined time is 60 seconds, but may be changed by the user. When the predetermined time (60 seconds) has not yet passed (step S407: No), the door opening/closing control device 303 checks opening/closing of the door 301 again (step S406). When the predetermined time has passed, the timer is caused to stop (step S408), and the door 301 is locked again (step S400).

When receiving data from the door opening/closing control device 303 through the information acquisition unit 170 (step S201: Yes), the controller 110 of the mobile terminal 100 determines whether or not the W-LAN service is present based on the service provision information (step S202). When a determination result represents that the W-LAN service is present (step S202: Yes), i.e., the door opening/closing control device 303 transmits service provision information indicating that the W-LAN service is present at the area inside the door 301, the controller 110 turns on the power of the mobile terminal communication unit 120 (i.e., W-LAN communication unit) to enable the function thereof (step S203).

Next, the controller 110 starts up the timer 1111 for counting a predetermined time (in the example, 30 seconds) (step S204). Thereafter, the controller 110 communicates with the mobile terminal communication unit 120 to determine whether or not the mobile terminal communication unit 120 tracks the W-LAN base station 210 so that W-LAN communication is possible (step S206). When the mobile terminal communication unit 120 can perform W-LAN communication (step S206: Yes), the controller 110 stops the timer 1111 (step S205), and restarts the timer 1111 again (step S204).

When W-LAN communication is not possible (step S206: No), the controller 110 determines whether or not 30 seconds are elapsed since the timer 1111 has started (step S207). When 30 seconds have not yet elapsed (step S207: No), the controller 110 determines whether or not W-LAN communication is possible, again (step S206). When 30 seconds have elapsed (step S207: Yes), the controller 110 causes the timer 1111 to stop (step S208), turns off the power of the mobile terminal communication unit 120, and disables the function thereof (step S209). The controller 110 shifts the process to the step S201, and repeats the foregoing process.

According to the entrance management device 300, the user of the mobile terminal 100 can enable the W-LAN in the predetermined area where the W-LAN service is provided without consciousness when entering into the area inside the door 301.

The applied examples illustrated in FIGS. 3 to 6 can be applied to the example in FIG. 6.

For example, in the example illustrated in FIG. 6, in a case where the user enters into the area inside the door 301, when the user of the mobile terminal 100 does not subscribe the W-LAN service provided in the area (step S202: No), the controller 110 turns off the power of the mobile terminal communication unit 120 to disable the communication function thereof.

In this case, the procedure indicated by the flow in FIG. 5 may be executed, and the display device 140 may be caused to display a message to the effect that even though the W-LAN service is provided in the area but is not available because it is not subscribed, and a message for prompting the user to subscribe the service.

In the example illustrated in FIG. 6, when information on the wireless communication service provided in the predetermined area is transmitted to the mobile terminal 100 through the information acquisition unit 170 (step S404), setting information like an encryption key, a control parameter, and the like necessary for connection with the wireless communication service may be transmitted together with the information on the wireless communication service. The controller 110 of the mobile terminal 100 may perform necessary setting to the mobile terminal communication unit 120 in accordance with the received setting information.

The example in FIG. 6 is a case where the information acquisition unit 170 is used in entering into the predetermined area, but the embodiment of the invention can be applied to other cases.

When the information acquisition unit 170 is used, if the W-LAN service is provided near the information acquisition unit 170, the information supply device notifies the controller 110 of the presence of the W-LAN service through the information acquisition unit 170. The controller 110 receives the notification, turns on the power of the mobile terminal communication unit 120 and enables the function thereof.

For example, a case where payment is made using the information acquisition unit 170 in purchasing an article for sale at a self-service coffee house (a withdrawing process from a prepaid charge stored in an IC module, a credit process, or the like) is now considered. If a W-LAN service is provided in the coffee house, the information supply device transmits information on the provision of the W-LAN service together with information on the settlement of the fee. The controller 110 of the mobile terminal 100 receives those pieces of information, and turns on the power of the mobile terminal communication unit 120 to enable the communication function thereof.

When the information acquisition unit 170 is used, the information acquisition unit 170 notifies the controller 110 that "it is used", and when receiving this notification, the controller 110 turns on the power of the mobile terminal communication unit 120 to enable the communication function thereof.

For example, an example case where the entrance management device 300 in FIG. 6 performs entrance management will be considered. An operation in this case is illustrated in the flowchart in FIG. 8.

First, when the power of the cellular phone wireless system is turned on (step S501), the information acquisition unit 170 notifies the controller 110 of a communication with the information supply device 302. When receiving the notification (step S502: Yes), the controller 110 turns on the power of the mobile terminal communication unit 120 to enable the communication function thereof (step S503), then the timer 1111 is started (step S504).

Thereafter, when the owner of the mobile terminal 100 passes through the door 301 and enters into the area where a wireless communication service is provided (step S506: Yes), the wireless communication service using the mobile terminal communication unit 120 becomes available (step S204→S206→S205→S204→ . . . ), then the timer 1111 is caused to stop (step S505).

Subsequently, when the owner of the mobile terminal 100 gets out from the area where the wireless communication service is provided, the mobile terminal communication unit 120 becomes unable to use the wireless communication service (step S506: No).

In this case, when a state where the wireless communication service is unavailable is maintained for a predetermined time (for example, 30 seconds) (step S507: No), the timer 1111 is stopped (step S508) and the mobile terminal communication unit 120 notifies the controller 110 of that state. When receiving the notification, the controller 110 turns off the power of the mobile terminal communication unit 120 to disable the function thereof (step S509). The predetermined time may be other than 30 seconds, and may be changed by the user.

When controlling the mobile terminal communication unit 120, the controller 110 may change the operation mode of the mobile terminal communication unit 120.

For example, in the case of the example in FIG. 6, when receiving a notification from the information acquisition unit 170 that the information acquisition unit 170 communicates with the information supply device 302, the controller 110 increases the frequency of an operation of tracking the wireless communication service to be executed by the mobile terminal communication unit 120 (for example, one rank up from a plurality of frequencies, changing of the setting of an interruption timer which sets the frequency).

In this case, each of the plurality of frequencies of performing the tracking operation of the wireless communication service is set beforehand in such a manner as to have a different value. Further, as illustrated in FIG. 10A, frequency rank association information which associates a frequency of performing the tracking operation with a frequency rank indicating the largeness of the frequency of the tracking operation can be stored in the memory unit 130.

When the controller 110 receives a notification from the information acquisition unit 170 to the effect that the information acquisition unit 170 communicates with the information supply device 302, one frequency rank in the plural pieces of frequency rank association information may be selected and set under a control of the controller 110.

When the controller 110 selects one frequency rank in the frequency rank association information, a setting state is like one illustrated in FIG. 10B. At this time, the frequency of the tracking operation assigned to the mobile terminal communication unit 120 is larger than the frequency of the tracking operation assigned to the wide-area communication unit 160, so that the W-LAN is used in preference to the cellular phone wireless system.

However, when there is an incoming call from the cellular phone wireless system (public network), the process is interrupted by a communication process of the wide-area communication unit 160 to enable communication using the wide-area communication unit 160. This enables reception of an incoming call from the cellular phone wireless system.

The display unit 140 may be caused to display a message indicating that the information acquisition unit 170 communicates with the information supply device 302, and the user who checks the message may manipulate the input unit 150 to select one frequency rank, thereby changing the frequency of the tracking operation.

The memory unit 130 may store a value of a tracking operation execution interval which indicates the interval of timings of executing the tracking operation, and the tracking operation execution interval may be changed under a control of the controller, or through manipulation of the input unit 150 by the user. The timer 1111 may count an elapsed time from a time when the tracking operation is executed at last to determine whether or not a time defined by the tracking operation execution interval has elapsed.

When the owner of the mobile terminal 100 gets out from the area where the wireless communication service is provided, the mobile terminal communication unit 120 becomes unable to use the wireless communication service (step S506: No). In this case, when a state where the wireless communication service is unavailable is maintained for a predetermined time, the mobile terminal communication unit 120 notifies the controller 110 that such a state is maintained for the predetermined time. When receiving the notification, the controller 110 reduces the frequency of the tracking operation of the wireless communication service to be executed by the mobile terminal communication unit 120 (e.g., the frequency is reduced by one rank from plural frequencies, setting of an interruption timer which sets the frequency is changed).

Figure 13:
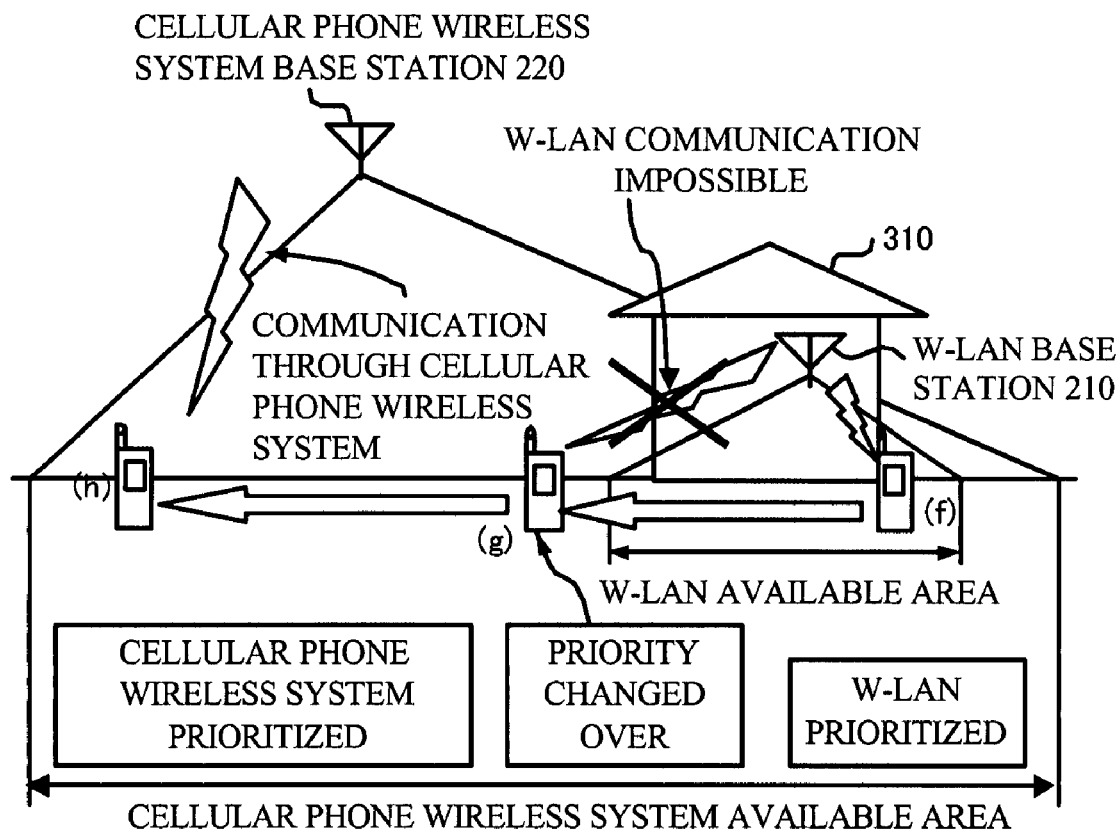
FIG. 13 is a diagram illustrating an example case where the portable electronic device of the embodiment of the invention is used.

For example, in the mobile terminal 100 in a state (f) in FIG. 13, it is supposed that the frequency ranks illustrated in FIG. 10B are selected from the frequency rank association information in FIG. 10A, and are set to the mobile terminal communication unit 120 and the wide-area communication unit 160, respectively. In this case, as the user having the mobile terminal 100 gets out of a building 310 (state (h)), the W-LAN becomes unavailable, the controller 110 changes the frequency ranks as illustrated in FIG. 10C, and disables the mobile terminal communication unit 120. In this case, it is desirable that power supply to the mobile terminal communication unit 120 not to be used should be terminated to turn off the power thereof.

Figure 8:
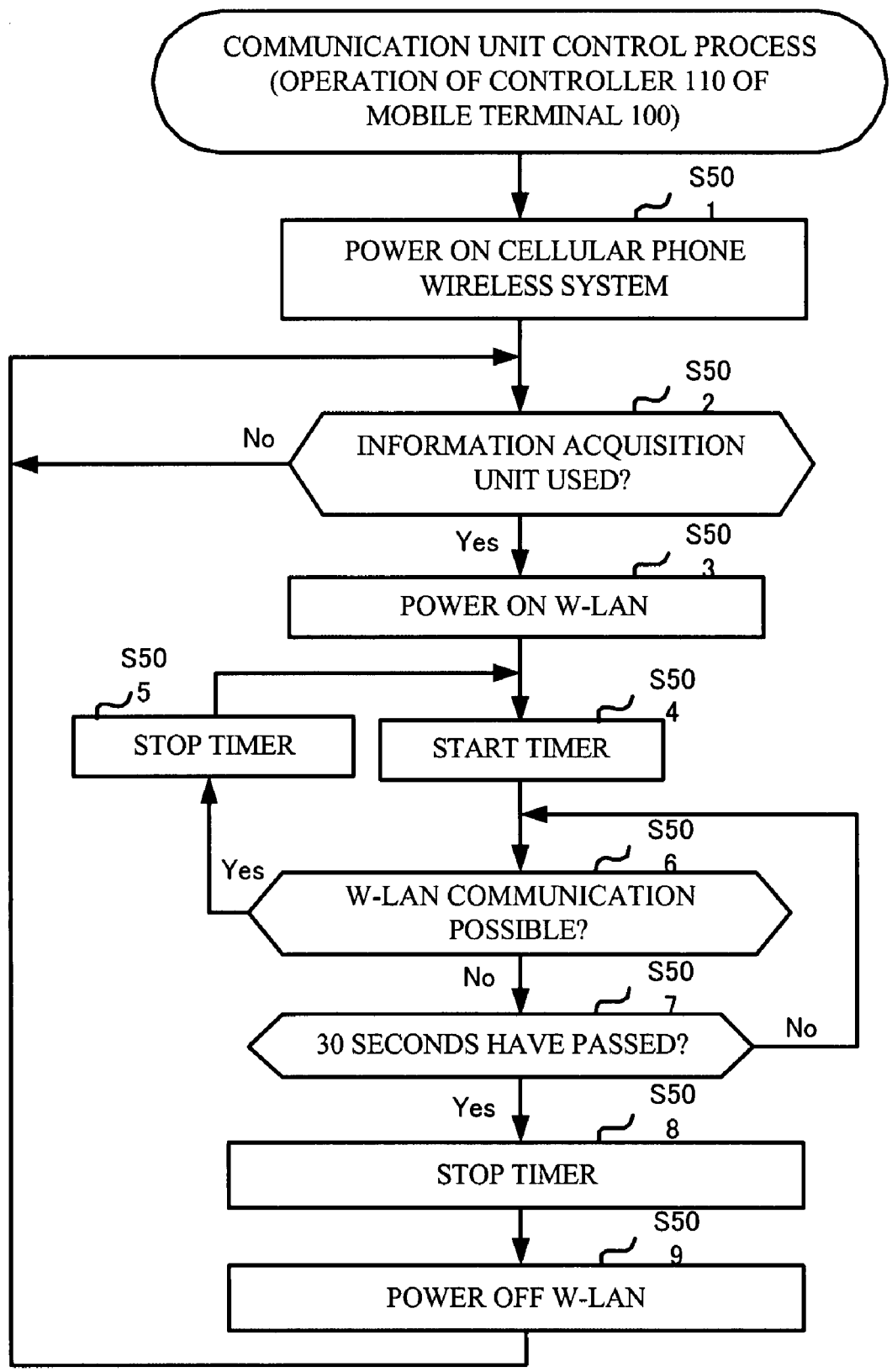
FIG. 8 is a flowchart illustrating the operation of an example case where the portable electronic device of the invention is used.
Figure 9:
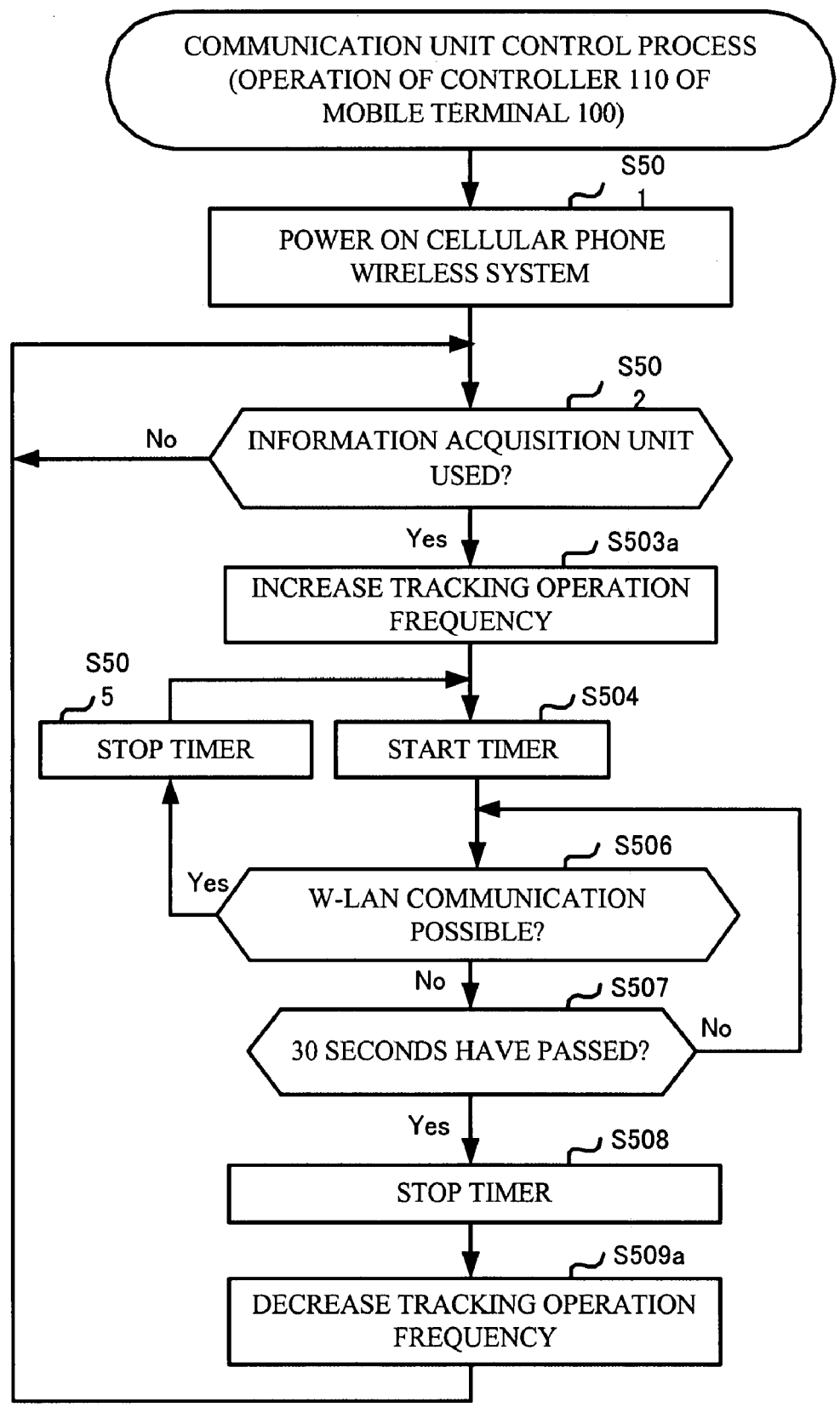
FIG. 9 is a flowchart illustrating a modified example of the flowchart illustrated in FIG. 8.

As illustrated in FIG. 9, the flowchart of this operation has a process of "increasing the tracking operation frequency" (step S503a) replacing the process of the step S503 in the flowchart in FIG. 8, and a process of "decreasing the tracking operation frequency" (step S509a) replacing the process of the step S509.

The mobile terminal 100 in FIG. 1 has two kinds of communication units, one is the mobile terminal communication unit 120 and the other is the wide-area wireless communication unit 160. Priorities indicating the degree that either one of the mobile terminal communication unit 120 and the wide-area wireless communication unit 160 is preferentially used in performing wireless communication are so set beforehand as to differ from each other, and allocated to those communication units.

In this case, as setting of the priorities illustrated in FIGS. 15A, 15B, the priorities allocated to the mobile terminal communication unit 120 and the wide-area wireless communication unit 160, respectively, may be stored in the memory unit 130. A priority may be selected from those priorities under a control of the controller 110, or, the user may select a priority through manipulation of the input unit 150.

A communication unit allocated with a high priority may be preferentially used to perform communication when the mobile terminal 100 performs communication.

For example, it is supposed that the mobile terminal 100 is in operation in accordance with the setting of the priorities illustrated in FIG. 15A. In the priorities illustrated in FIGS. 15A, 15B, it is supposed that priority 1 has a higher priority than priority 2. That is, when the mobile terminal 100 performs communication, a communication unit allocated with priority 1 is used in preference to another communication unit allocated with priority 2.

In an area where the mobile terminal 110 is located, when communication through a communication unit having a high priority is impossible because a wireless communication service complying with the communication unit having the high priority is not provided, or, when the wireless communication service complying with the communication unit having the high priority does not meet the request of the user of the mobile terminal 100, communication is carried out using a communication unit having a low priority like the setting of the priorities illustrated in FIG. 15B.

In this case, it is desirable that power supply to the communication unit not to be used should be terminated to turn off the power thereof.

In the mobile terminal 100 in FIG. 1, the mobile terminal communication unit 120 is used as the W-LAN communication unit, and the wide-area communication unit 160 is used as the cellular-phone-wireless-system communication unit.

The W-LAN has an advantage such that the communication speed thereof is fast and the communication cost is low, but has a disadvantage such that an area where communication is possible is narrow. In contrast, the cellular phone wireless system has an advantage such that an area where communication is possible is wide, but has a disadvantage such that the communication speed thereof is slow and the communication cost is high.

Like the setting of the priorities illustrated in FIG. 15B, the priority of the mobile terminal communication unit 120 which is the W-LAN communication unit is set at high (priority 1 is allocated), while the priority of the wide-area wireless communication unit 160 which is the cellular-phone-wireless-system communication unit is set at low (priority 2 is allocated).

Accordingly, in an area where the W-LAN service is provided, the W-LAN is preferentially used, so that fast and low-cost communication becomes available. On the other hand, in an area where the W-LAN service is not provided, the cellular phone wireless system is used, but a desire of the user like doing communication is fulfilled.

Those priorities are set by default in, for example, the memory unit 130. Or, the user may manipulate the input unit 150 to input priority information, and cause the memory unit 130 to store the information, or the default priority to be changed.

However, if the priority of the cellular phone wireless system (wide-area wireless communication unit 160) is set at high, the cellular phone wireless system is used in an area where the W-LAN is available, so that an opportunity of using the W-LAN will be missed.

Figure 11:
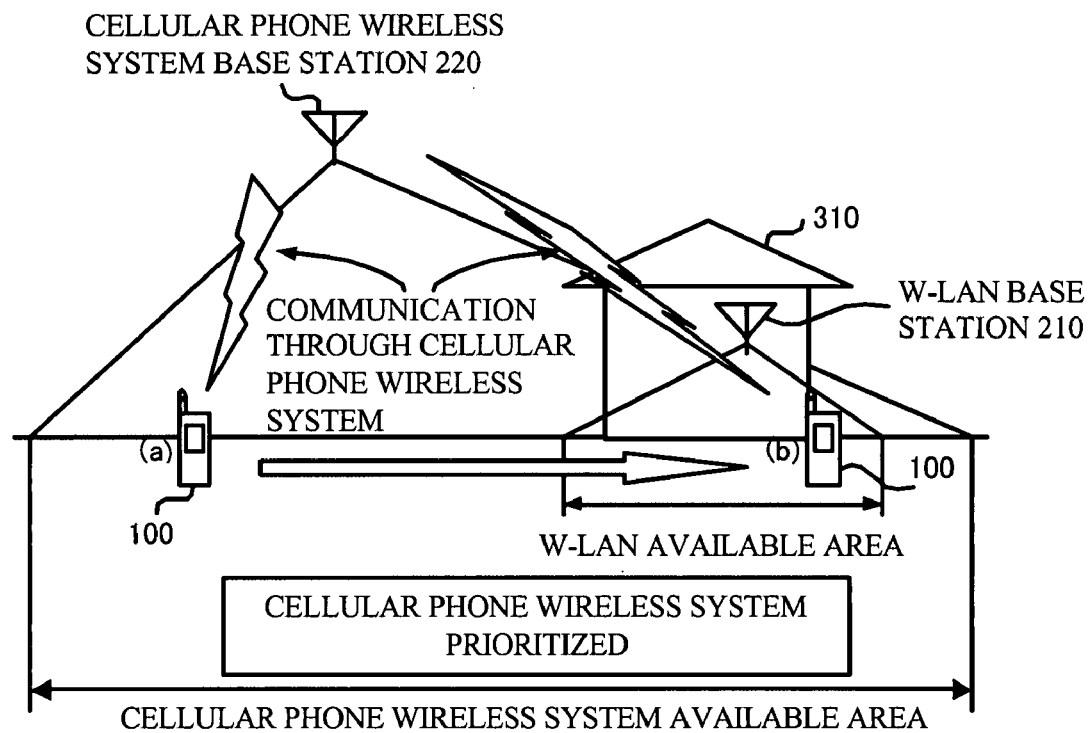
FIG. 11 is a diagram illustrating an example case where the portable electronic device of the embodiment of the invention is used.

For example, as illustrated in FIG. 11, the mobile terminal 100 in a state (a) is located in an area where the cellular phone wireless system is available but the W-LAN is not available. At this time, even if the mobile terminal 100 in the state (a) moves to (state (b)) an area where both of the cellular phone wireless system and the W-LAN are available, the cellular phone wireless system is used, so that there is no opportunity to use the W-LAN.

Consequently, the information acquisition unit 170 notifies the controller 110 of a communication with the information supply device 230 (302), and when receiving this notification, the controller 110 may change the priorities of the two communication units of the mobile terminal communication unit 120 and the wide-area wireless communication unit 160.

Figure 12:
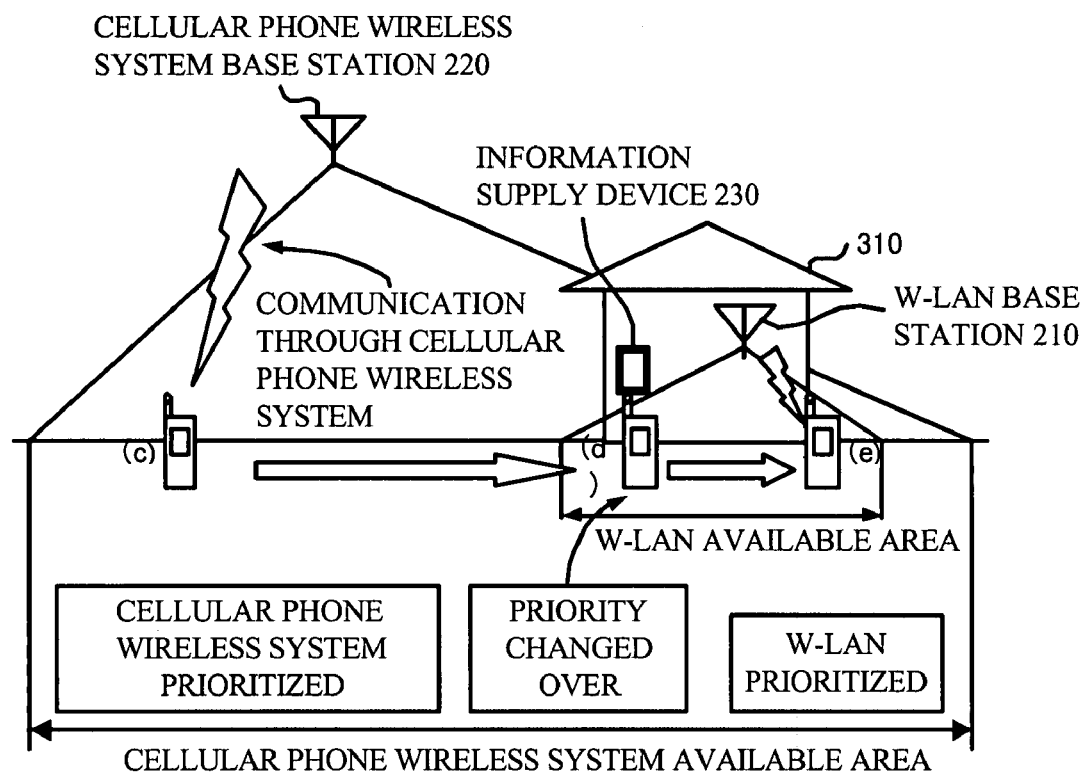
FIG. 12 is a diagram illustrating an example case where the portable electronic device of the embodiment of the invention is used.

With reference to FIGS. 12 and 13, an explanation will be given of an example embodiment such that the wide-area wireless communication unit 160 which is the cellular-phone-wireless-system communication unit is preferentially used in the outside where securing power is difficult, and the mobile terminal communication unit 120 which is the W-LAN communication unit is preferentially used in the inside where securing power is easy.

As illustrated in FIG. 12, there is the building 310 provided with the entrance management device 300 in FIG. 6.

In moving into the building 310 from outside the building 310 (state (c)), the door opening/closing control device 303 communicates with the information acquisition unit 170 of the mobile terminal 100, and determines whether or not the owner of the mobile terminal 100 has a permission to enter the building 310.

Simultaneously, the information acquisition unit 170 notifies the controller 110 of the use of the information acquisition unit 170. At this time, the controller 110 increases the priority of the mobile terminal communication unit 120 which is the W-LAN communication unit, and causes the mobile terminal communication unit 120 to be used in preference to the wide-area wireless communication unit 160 which is the cellular-phone-wireless-system communication unit (state (d)).

Accordingly, fast and low-cost W-LAN communication becomes preferentially available inside the building 310 (state (e) in FIG. 12).

As illustrated in FIG. 13, when the mobile terminal 100 moves outside the building 310, the mobile terminal communication unit 120 which is the W-LAN communication unit becomes unable to use the W-LAN communication service (state (g)). When the state (g) is maintained for a predetermined time, the controller 110 increases the priority of the wide-area wireless communication unit 160 which is the cellular-phone-wireless-system communication unit, and changes the priority in such a way that the wide-area wireless communication unit 160 is used in preference to the mobile terminal communication unit 120 which is the W-LAN communication unit.

Accordingly, the cellular phone wireless system whose communication area is wide becomes preferentially available outside the building 310 (state (h)).

Figure 14:
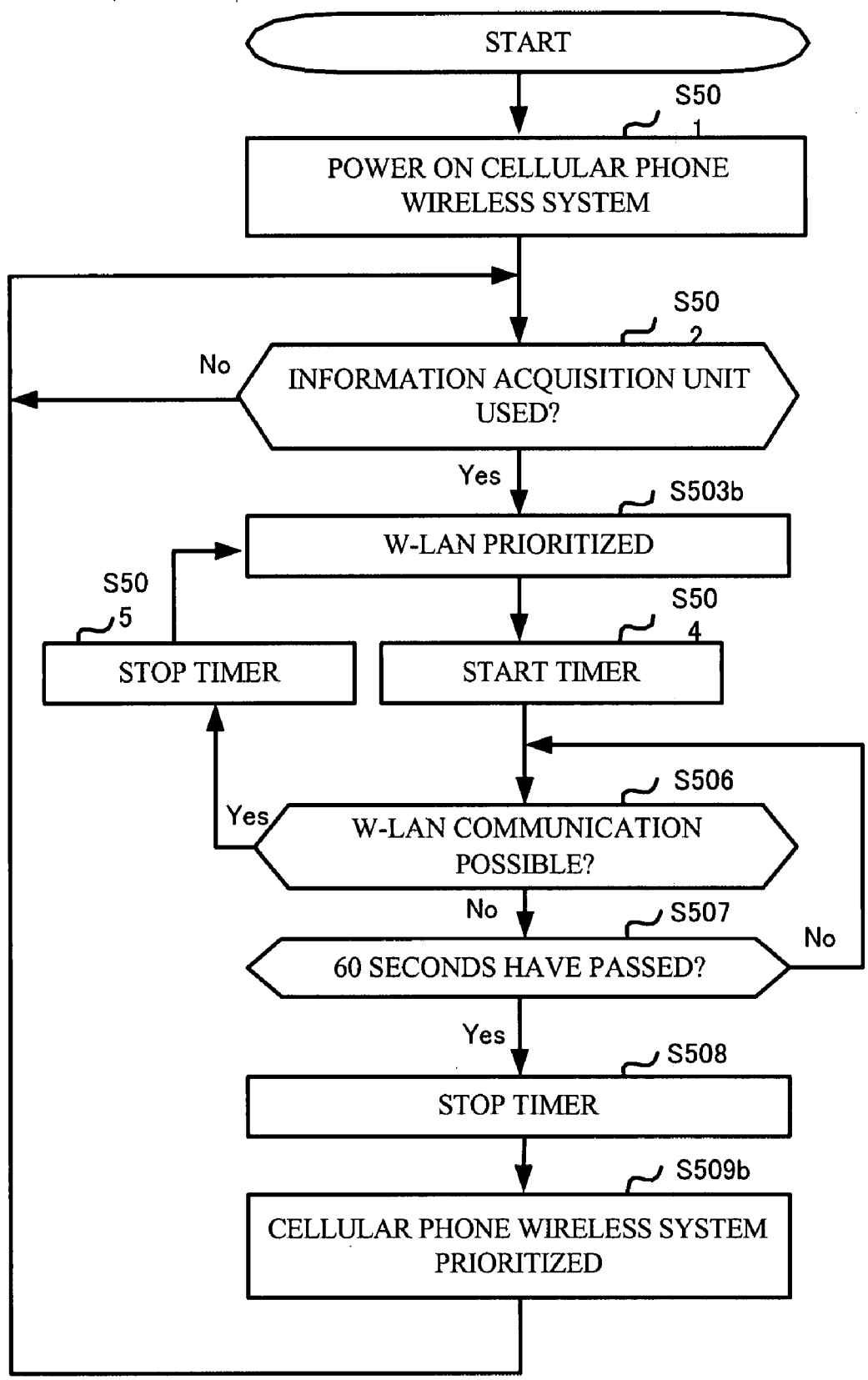
FIG. 14 is a flowchart illustrating a modified example of the flowchart illustrated in FIG. 8.

As illustrated in FIG. 14, the flowchart of the operation has step S503b of changing over to "W-LAN is prioritized" which replaces the step S503 of the flowchart in FIG. 8, and step S509b of changing over to "cellular phone wireless system is prioritized" which replaces the step S509.

Figure 16A:
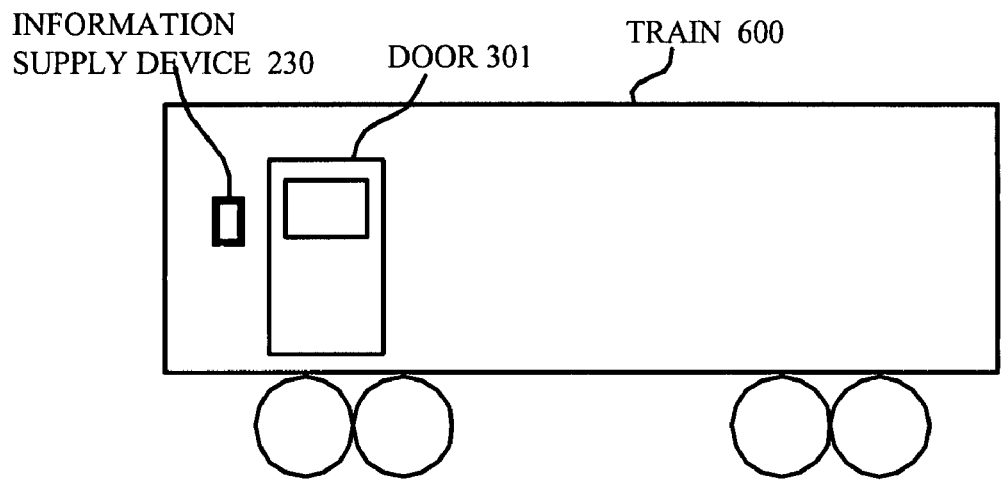
FIGS. 16A and 16B are diagrams illustrating an example case where the portable electronic device of the embodiment of the invention is used.

An object at which the entrance management device in FIG. 6 is placed may not be the building 310 in FIGS. 12 and 13, and may be a train 600 illustrated in FIG. 16A, or an moving object, such as an airplane or a vehicle.

Figure 16B:
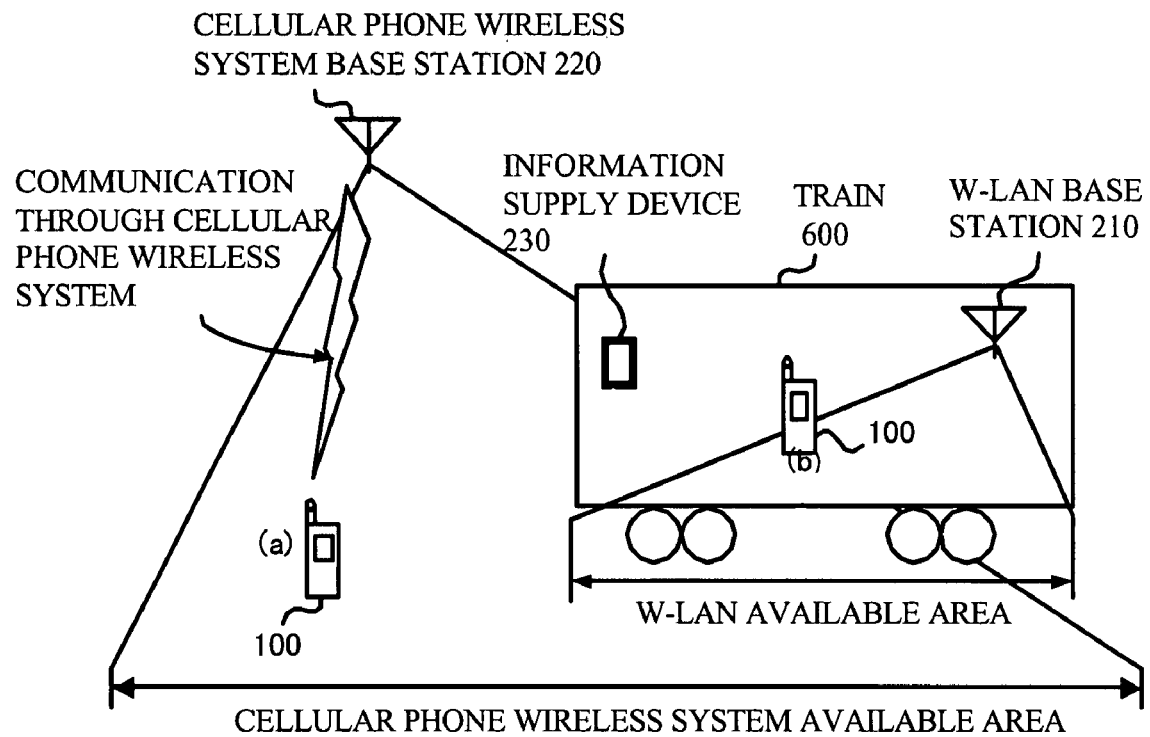

In the example case of the train 600, as illustrated in FIG. 16B, only the cellular phone wireless communication service is available outside the train 600 (state (a)).

On the other hand, when the user is on the train 600 (state (b)), the cellular phone wireless communication service is available, and the W-LAN service provided inside the train 600 is also available.

Regarding the use of the mobile terminal 100 in the train 600, securing power is easy like the example in FIGS. 11 and 12. Thus, the priority of the mobile terminal communication unit 120 which is the W-LAN communication unit may be set higher than the priority of the wide-area wireless communication unit 160 as illustrated in FIG. 15B, so that the mobile terminal communication unit 120 may be used preferentially.

The present invention is not limited to the foregoing embodiment, and can be modified and changed in various forms.

Each of the mobile terminal communication unit 120 and the wide-area wireless communication unit 160 in the foregoing embodiment has one communication function, but may have plural communication functions.

For example, the mobile terminal communication unit 120 may have plural communication functions each of which have different standards, frequency bandwidths, and modulation schemes, and the wide-area wireless communication unit 160 may have a cellular phone communication function and a PHS function in different generations.

In this case, the controller 110 enables a function to be used and disables a function not to be used, for example. When there is a communication module which does not use all functions, the controller 110 turns off the power of that communication module.

Priorities may be allocated to the plural communication functions of the mobile terminal communication unit 120 and/or the plural communication functions of the wide-area wireless communication function 160, and may be changed in accordance with the communication contents (or a communication) of the information acquisition unit 170.

Further, the mobile terminal 100 may have a plurality of mobile terminal communication units 120 and a plurality of wide-area wireless communication units 160.

Figure 17:
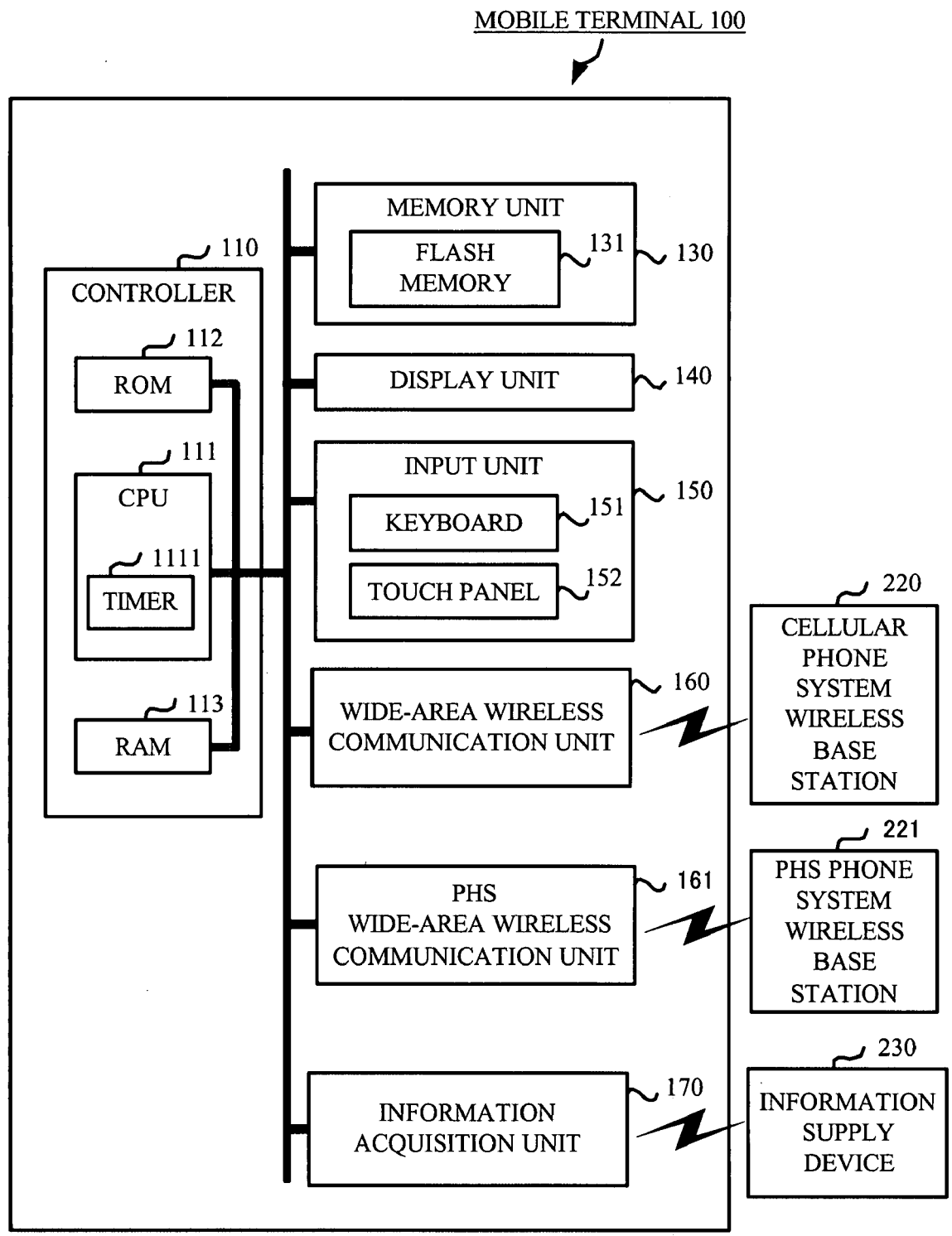
FIG. 17 is a diagram illustrating a portable electronic device according to a modified example of the embodiment of the invention.

For example, a plurality of mobile terminal communication units 120 having different standards, frequency bandwidths, and modulation schemes may be laid out, or, as illustrated in FIG. 17, the wide-area wireless communication unit 160 and a PHS wide-area wireless communication unit 161 in different generation may be laid out.

In this case, for example, the controller 110 turns on the power of a communication module to be used to enable the function thereof, and turns off the power of a communication module not to be used to disable the function thereof. Priorities may be allocated to the plurality of mobile terminal communication units 120 and/or the plurality of wide-area wireless communication units 160, and may be changed in accordance with the communication contents (or communication) of the information acquisition unit 170.

In the foregoing embodiment, the information acquisition unit 170 and the information supply device 230 are used as devices for transmitting and receiving control information, but the invention is not limited to this case, and can use arbitrary communication schemes.

A possible mobile terminal 100 varies widely, and is a cellular phone, a PDA (Personal Data Assistance), a personal computer (laptop type, or the like), a wearable computer, or a computer provided at a moving object like a vehicle, a ship.

The invention can be applied to an arbitrary electronic device having a communication function, not limited to an exclusive computer system. That is, a computer program for causing a computer to function and operate as the foregoing portable electronic device may be created, distributed, lent, and installed in the computer, so that the computer as the portable electronic device can be used, sold, and lent.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2006-66802 filed on Mar. 10, 2006 and including specification, claims, drawings and summary. The disclosure of the above Japanese Patent Application is incorporated herein by reference in its entirety.

What is claimed is:

1. A portable electronic device comprising:
a public line wireless communication circuit having a communication function of performing wireless communication with a public network;
a LAN wireless communication circuit having a communication function of performing wireless data communication with a local area network;
an information acquisition unit that performs short-range wireless communication with an information supply device which supplies information; and
a communication controller which enables or disables the communication function of the LAN wireless communication circuit in accordance with a communication of the information acquisition unit with the information supply device,
wherein priorities, each indicating a degree that the public line wireless communication circuit or the LAN wireless communication circuit is preferentially used in performing wireless communication, are allocated to the public line wireless communication circuit and the LAN wireless communication circuit, respectively, and
the communication controller has a function of changing the respective priorities of the public line wireless communication circuit and the LAN wireless communication circuit, based on whether the device is determined to be inside or outside of a building, when the information acquisition unit notifies the communication controller of the communication with the information supply device, such that the changing of the priorities comprises:
setting the priority of the LAN wireless communication circuit higher than that of the public line wireless communication circuit and prioritizing use of the LAN wireless communication circuit when the device is determined to be inside the building,
raising the priority of the public line wireless communication circuit and prioritizing use of the public line wireless communication circuit when the device is determined to be outside the building or the LAN wireless communication circuit is disabled for more than a predetermined time, and
raising the priority of the LAN wireless communication circuit and prioritizing use of the LAN wireless communication circuit when both the LAN wireless communication circuit and the public line wireless communication circuit are enabled and the device is determined to be inside the building.

2. The portable electronic device according to claim 1, wherein
the information supply device transmits service provision information indicating a state where a wireless communication service is provided at a location at which the information supply device is provided to the information acquisition unit,
the information acquisition unit receives the service provision information transmitted from the information supply device, and transmits the service provision information to the communication controller, and
the communication controller determines whether the wireless communication service is provided based on the service provision information received from the information acquisition unit, enables the communication function of the LAN wireless communication circuit when it is determined that the wireless communication service is provided, and disables the communication function of the LAN wireless communication circuit when it is determined that the wireless communication service is not provided.

3. The portable electronic device according to claim 2, further comprising:
a memory unit which stores predetermined information indicating a wireless communication service subscribed to by the local portable electronic device; and
a subscription determination unit which determines whether the portable electronic device subscribes to the wireless communication service determined by the communication controller based on the predetermined information stored in the memory unit, when the communication controller determines that the wireless communication service is provided based on the service provision information received from the information acquisition unit,
wherein the communication controller enables the communication function of the LAN wireless communication circuit when the subscription determination unit determines that the wireless communication service is subscribed to, and disables the communication function of the LAN wireless communication circuit when the subscription determination unit determines that the wireless communication service is not subscribed to.

4. The portable electronic device according to claim 3, further comprising a notification unit that notifies a user of the portable electronic device of a presence of a wireless communication service which becomes available if subscribed to when the communication controller determines that the wireless communication service is provided but the subscription determination unit determines that the portable electronic device does not subscribe to the wireless communication service determined by the communication controller.

5. The portable electronic device according to claim 2, wherein
the service provision information received by the information acquisition unit from the information supply device includes setting information for using a wireless communication service, and
the communication controller sets the LAN wireless communication circuit in accordance with the setting information included in the received service provision information when it is determined that the wireless communication service is provided based on the service supply information received from the information acquisition unit.

6. The portable electronic device according to claim 1, wherein
the communication controller has a timer which determines whether a predetermined time has elapsed, and
the communication controller disables the communication function of the LAN wireless communication circuit when the communication function of the LAN wireless communication circuit is enabled and the LAN wireless communication circuit does not use the wireless communication service for more than or equal to the predetermined time counted by the timer.

7. The portable electronic device according to claim 1, wherein
the public line wireless communication circuit communicates with a wireless base station in performing wireless communication with the public network,
the LAN wireless communication circuit communicates with a wireless LAN base station in performing wireless data communication with the local area network,
a communication range of the information acquisition unit with the information supply device is narrower than a communication range of the public line wireless communication circuit with the wireless base station, or a communication range of the LAN wireless communication circuit with the LAN base station, and
the information acquisition unit has less power consumption than those of the public line wireless communication circuit and the LAN wireless communication circuit.

8. The portable electronic device according to claim 1, wherein
the information acquisition unit notifies the communication controller of a communication with the information supply device, and
the communication controller enables the communication function of the LAN wireless communication circuit when notified by the information acquisition unit of the communication with the information supply device.

9. The portable electronic device according to claim 1, wherein
the communication controller has a timer which counts an elapsed time for determining whether a predetermined time has elapsed, and
the communication controller changes the operation mode of the LAN wireless communication circuit when the communication function of the LAN wireless communication circuit is enabled and the LAN wireless communication circuit does not use the wireless communication service for more than or equal to the predetermined time counted by the timer.

10. The portable electronic device according to claim 1, wherein
the public line wireless communication circuit and the LAN wireless communication circuit have tracking functions of tracking wireless communication systems, respectively,
the communication controller has a function of changing a frequency of an operation of tracking the wireless communication systems by the tracking function, and
the communication controller changes the frequencies of operations of tracking the wireless communication systems by the tracking functions of the public line wireless communication circuit and the LAN wireless communication circuit, thereby changing the respective operation modes of the public line wireless communication circuit and the LAN wireless communication circuit, when the information acquisition unit notifies the communication controller of the communication with the information supply device.

11. A communication function changeover method comprising:
acquiring information by communicating with an information supply device which supplies information;
changing a state of a first communication function of transmitting/receiving data in accordance with the communication with the information supply device;
enabling or disabling the first communication function in accordance with the state of the first communication function;
allocating a priority to the first communication function indicating a degree that the first communication function is preferentially used in performing wireless communication; and
changing the priority of the first communication function, based on whether the device is determined to be inside or outside of a building, upon the communication with the information supply device, such that the changing of the priorities comprises:
setting the priority of the first communication function higher than that of a second communication function and prioritizing use of the first communication function when the device is determined to be inside the building,
raising the priority of the second communication function and prioritizing use of the second communication function when the device is determined to be outside the building or the first communication function is disabled for more than a predetermined time, and
raising the first communication function and prioritizing use of the first communication function when both the first communication function and the second communication function are enabled and the device is determined to be inside the building.

* * * * *